(12) United States Patent
Tsurusu et al.

(10) Patent No.: US 11,960,527 B2
(45) Date of Patent: Apr. 16, 2024

(54) BURIED OBJECT INFORMATION MANAGEMENT DEVICE, BURIED OBJECT INFORMATION MANAGEMENT SYSTEM COMPRISING SAME, BURIED OBJECT INFORMATION MANAGEMENT METHOD, AND BURIED OBJECT INFORMATION MANAGEMENT PROGRAM

(71) Applicant: OMRON CORPORATION, Kyoto (JP)

(72) Inventors: Tetsuro Tsurusu, Kyoto (JP); Shingo Kawamoto, Kyoto (JP); Mitsunori Sugiura, Kyoto (JP); Takahide Yagi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 135 days.

(21) Appl. No.: 17/508,372

(22) Filed: Oct. 22, 2021

(65) Prior Publication Data

US 2022/0164379 A1 May 26, 2022

(30) Foreign Application Priority Data

Nov. 25, 2020 (JP) ................................. 2020-195074

(51) Int. Cl.
*G06F 16/00* (2019.01)
*G06F 3/14* (2006.01)
(Continued)

(52) U.S. Cl.
CPC .......... *G06F 16/532* (2019.01); *G06F 3/1423* (2013.01); *G06F 16/538* (2019.01);
(Continued)

(58) Field of Classification Search
CPC .... G06F 16/532; G06F 3/1423; G06F 16/538; G06F 16/5854; G06F 18/22;
(Continued)

(56) References Cited

U.S. PATENT DOCUMENTS

| | | |
|---|---|---|
| 5,296,807 A | 3/1994 | Kousek et al. |
| 6,609,451 B1 | 8/2003 | Inoue et al. |

(Continued)

FOREIGN PATENT DOCUMENTS

| | | |
|---|---|---|
| JP | H5-45472 A | 2/1993 |
| JP | H05-281366 A | 10/1993 |

(Continued)

OTHER PUBLICATIONS

Office Action dated Sep. 5, 2023 in a related Japanese patent application.

(Continued)

*Primary Examiner* — Jared M Bibbee
(74) *Attorney, Agent, or Firm* — METROLEX IP LAW GROUP, PLLC

(57) ABSTRACT

A buried object information management unit manages information about a buried object included in a search image showing the presence or absence of the buried object in a wall surface generated by a buried object scanning device that is scanned along a wall surface, and comprises a data receiving unit, an input unit, and a collation unit. The data receiving unit acquires search information including the search image generated by the buried object scanning device. To the input unit is inputted construction information including position information about the buried object in the wall surface. The collation unit collates the search information acquired by the data receiving unit with the construction information inputted to the input unit, and determines whether or not there is a match.

16 Claims, 31 Drawing Sheets

(51) Int. Cl.
  *G06F 16/532* (2019.01)
  *G06F 16/538* (2019.01)
  *G06F 16/583* (2019.01)
  *G06F 18/22* (2023.01)
  *G06V 30/422* (2022.01)
  *G01V 11/00* (2006.01)

(52) U.S. Cl.
  CPC .......... *G06F 16/5854* (2019.01); *G06F 18/22* (2023.01); *G06V 30/422* (2022.01); *G01V 11/002* (2013.01)

(58) Field of Classification Search
  CPC .... G06V 30/422; G06V 20/10; G06V 20/176; G01V 11/002; G01V 3/165
  See application file for complete search history.

(56) References Cited

U.S. PATENT DOCUMENTS

| | | | |
|---|---|---|---|
| 6,679,153 B2 | 1/2004 | Inoue et al. | |
| 8,902,251 B2 | 12/2014 | Nielson et al. | |
| 8,907,978 B2 | 12/2014 | Nielson et al. | |
| 8,907,980 B2 | 12/2014 | Nielson et al. | |
| 8,917,288 B2 | 12/2014 | Nielson et al. | |
| 8,928,693 B2 | 1/2015 | Nielson et al. | |
| 8,929,693 B2 | 1/2015 | Shin et al. | |
| 8,994,749 B2 | 3/2015 | Nielson et al. | |
| 9,165,331 B2 | 10/2015 | Nielson et al. | |
| 9,189,821 B2 | 11/2015 | Nielson et al. | |
| 10,175,350 B1* | 1/2019 | Tsokos | G01V 3/12 |
| 2003/0136249 A1 | 7/2003 | Inoue et al. | |
| 2004/0107017 A1 | 6/2004 | Hoffmann et al. | |
| 2006/0071664 A1 | 4/2006 | Fujiwara | |
| 2011/0007076 A1 | 1/2011 | Nielson et al. | |
| 2011/0279230 A1 | 11/2011 | Nielson et al. | |
| 2011/0279476 A1 | 11/2011 | Nielson et al. | |
| 2011/0283217 A1 | 11/2011 | Nielson et al. | |
| 2011/0285749 A1 | 11/2011 | Nielson et al. | |
| 2013/0135343 A1 | 5/2013 | Nielson et al. | |
| 2013/0147637 A1 | 6/2013 | Nielson et al. | |
| 2013/0170731 A1 | 7/2013 | Hirota | |
| 2013/0174072 A9 | 7/2013 | Nielson et al. | |
| 2015/0243054 A1 | 8/2015 | Nielson et al. | |
| 2015/0332202 A1 | 11/2015 | Nielson et al. | |
| 2015/0339516 A1* | 11/2015 | Yano | G06T 7/74 382/118 |
| 2017/0131426 A1 | 5/2017 | Sgarz et al. | |
| 2017/0153349 A1 | 6/2017 | Krapf et al. | |
| 2017/0153350 A1 | 6/2017 | Krapf et al. | |
| 2017/0153356 A1 | 6/2017 | Zibold | |
| 2018/0260669 A1 | 9/2018 | Konishi | |
| 2019/0156137 A1* | 5/2019 | Nguyen | G06V 20/63 |
| 2022/0036042 A1 | 2/2022 | Takata et al. | |
| 2022/0214437 A1* | 7/2022 | Mochizuki | G01S 7/06 |

FOREIGN PATENT DOCUMENTS

| | | |
|---|---|---|
| JP | H11-295045 A | 10/1999 |
| JP | 2000-310734 A | 11/2000 |
| JP | 2000-338255 A | 12/2000 |
| JP | 2003-098263 A | 4/2003 |
| JP | 2004-184286 A | 7/2004 |
| JP | 2005-517231 A | 6/2005 |
| JP | 2005-258821 A | 9/2005 |
| JP | 2006-153783 A | 6/2006 |
| JP | 2010-11210 A | 1/2010 |
| JP | 2013-140042 A | 7/2013 |
| JP | 2015-225234 A | 12/2015 |
| JP | 2017-040547 A | 2/2017 |
| JP | 2017-532528 A | 11/2017 |
| JP | 2019-185253 A | 10/2019 |
| JP | 2019-191927 A | 10/2019 |
| JP | 2020-154467 A | 9/2020 |
| JP | 2020-186994 A | 11/2020 |
| WO | 0002376 A1 | 1/2000 |

OTHER PUBLICATIONS

Office Action dated Oct. 3, 2023 in a related US patent application.
Japanese Office Action dated Oct. 10, 2023 in a counterpart Japanese patent application.
Office Action dated Nov. 22, 2023 in a related US patent application.
Office Action (JPOA) dated Oct. 31, 2023 in a related Japanese patent application, with English translation.

* cited by examiner

BURIED OBJECT TABLE

| BURIED OBJECT | WIDTH | THICKNESS |
|---|---:|---:|
| THROUGH-PILLAR | 150 | 150 |
| STAND PILLAR | 120 | 120 |
| STUD | 105 | 30 |
| BRACE | 90 | 90 |
| ... | ... | ... |
| JOIST | 105 | 105 |

FIG. 11

ACQUIRED DATA STORAGE TABLE

| TIME | X | Y | CAPACITANCE SENSOR | BURIED OBJECT DETERMINATION | BURIED OBJECT | SIZE |
|---|---|---|---|---|---|---|
| 0:00:00 | 1 | 1 | 500 | – | | – |
| 0:00:01 | 1 | 2 | 520 | – | | – |
| 0:00:02 | 1 | 3 | 520 | – | | – |
| 0:00:03 | 1 | 4 | 600 | – | | – |
| 0:00:05 | 2 | 4 | 640 | ○ | JOIST | 40 |
| 0:00:06 | 3 | 5 | 790 | ○ | JOIST | 40 |
| ... | ... | ... | ... | ... | | ... |
| 0:01:05 | 519 | 341 | 400 | – | | – |
| 0:01:06 | 520 | 340 | 340 | – | | – |

FIG. 12

DISPLAY BUFFER AREA

| X | Y | R | G | B |
|---|---|---|---|---|
| 1 | 1 | 255 | 255 | 255 |
| 1 | 2 | 255 | 255 | 255 |
| 1 | 3 | 255 | 255 | 255 |
| 1 | 4 | 255 | 255 | 255 |
| 1 | 5 | 125 | 125 | 125 |
| 1 | 6 | 120 | 120 | 120 |
| ... | ... | ... | ... | ... |
| 960 | 640 | 250 | 200 | 150 |
| 960 | 640 | 250 | 200 | 150 |

FIG. 13

SEARCH IMAGE STORAGE TABLE

| DATE | TIME | IMAGE DATA ID |
|---|---|---|
| 2020/9/18 | 9:50:00 | 200918_1.dat |
| 2020/9/18 | 10:00:00 | 200918_2.dat |
| 2020/9/18 | 11:00:00 | 200918_3.dat |
| 2020/9/20 | 9:00:00 | 200920_1.dat |
| 2020/9/22 | 8:50:00 | 200922_1.dat |
| ... | ... | ... |
| 2020/9/25 | 9:00:00 | 200925_1.dat |
| 2020/9/25 | 18:50:00 | 200925_2.dat |
| 2020/9/25 | 19:00:00 | 200925_3.dat |

FIG. 14

SEARCH IMAGE

PATTERN MATCHING

BURIED OBJECT STRUCTURE INFORMATION

BURIED OBJECT INFORMATION MANAGEMENT DEVICE, BURIED OBJECT INFORMATION MANAGEMENT SYSTEM COMPRISING SAME, BURIED OBJECT INFORMATION MANAGEMENT METHOD, AND BURIED OBJECT INFORMATION MANAGEMENT PROGRAM

CROSS-REFERENCE TO RELATED APPLICATIONS

This application claims priority to Japanese Patent Application No. 2020-195074 filed on Nov. 25, 2020. The entire disclosure of Japanese Patent Application No. 2020-195074 is hereby incorporated herein by reference.

BACKGROUND

Technical Field

The present invention relates to a buried object information management device for managing information about buried objects detected by a buried object scanning device for detecting buried objects such as metal and wood contained in walls and concrete, for example, and to a buried object information management system comprising this device, a buried object information management method, and a buried object information management program.

Description of the Related Art

A device that detects rebar and other such buried objects on the basis of a change in reflected electromagnetic waves emitted toward the surface of concrete while the device is moved over the surface of concrete has been used in recent years.

Patent Literature 1 discloses a buried object scanning device comprising an input unit for inputting data obtained by acquiring the signal value of reflected electromagnetic waves along a side line; a generation unit for generating a virtual waveform template having a spread of the reflected waveform according to the propagation depth of the electromagnetic waves; and a display unit for displaying both a signal value for the data and a virtual waveform template having a shape corresponding to the propagation depth.

CITATION LIST

Patent Literature

Patent Literature 1: JP-A 2017-040547

SUMMARY

However, the following problems are encountered with the conventional buried object scanning device discussed above.

With the buried object scanning device disclosed in the above publication, the position of a buried object in a target can be detected, but it is difficult to detect what kind of buried object has been installed.

In other words, a conventional buried object scanning device can detect a general differences in materials, such as between metal, wood, and plumbing pipes, based on the difference in specific gravity, but it is difficult to determine the appropriate construction method depending on the type of lumber or the like installed on the back of the wall, for example.

It is an object of the present invention to provide a buried object information management device capable of identifying the type of a buried object installed in a target, as well as a buried object information management system comprising said device, a buried object information management method, and a buried object information management program.

The buried object information management device according to the first invention manages information about a buried object included in an search image showing the presence or absence of a buried object in a target generated by a buried object scanning device scanned along the target, said buried object information management device comprising an acquisition unit, an input unit, and a collation unit. The acquisition unit acquires search information including the search image generated by the buried object scanning device. The input unit receives the input of construction information including position information about the buried object in the target. The collation unit collates the search information acquired by the acquisition unit with the construction information inputted to the input unit, and determines whether or not there is a match.

Here, a search image is acquired that shows the presence or absence of a buried object generated by a buried object scanning device that scans the surface of a target such as a wall surface or concrete to detect a buried object such as wood or metal contained in the target, this search image is compared with construction information including position information about the buried object in the target, and it is determined whether or not there is a match.

Here, the buried object information management device includes, for example, a PC (personal computer) used by a manager who manages a construction site, or a smartphone, tablet terminal, or the like owned by a worker. Also, the buried object information management device may be provided in the buried object scanning device that acquires the search information, that is, the configuration may be such that the buried object information management device is integrated with the buried object scanning device.

In addition to the search image, the search information acquired from the buried object scanning device includes, for example, dimensional (width) information in the scanning direction of the buried object included in the search image, the distance from the scanning start point (reference point) to the buried object, the distance between buried objects, and other such information.

The construction information inputted to the input unit includes, for example, dimensional information regarding the position and size of the buried object contained in the target, the screwing position to the buried object used in construction, the type, size, and number of screws, and other such information.

Also, the construction information may be inputted during collation by the collation unit, or may be information that was previously inputted and stored as collation information.

Consequently, if the result of collation between the acquired search information and the inputted construction information is that there is a match, the dimensions, type, and so forth of a detected buried object can be identified by referring to the buried object information included in the construction information, for example.

As a result, it is possible to identify, for example, that detected the buried object is a through-pillar, stand pillar, stud, beam, brace, joist, furring strip, girder, or other such piece of lumber, and this information can subsequently be put to use in screwing, drilling, or other such construction work.

The buried object information management device according to the second invention is the buried object information management device according to the first invention, wherein the collation unit collates the search information with the construction information by using the scanning starting point included in the search image as a reference point.

Consequently, whether or not the search image and the construction information match can be easily determined by comparing the two using the scanning start point included in search image and a reference point made on the target as references.

The buried object information management device according to the third invention is the buried object information management device according to the first or second invention, wherein the collation unit collates the search information with the construction information by using dimensional information related to the buried object.

Consequently, the position and size of a buried object can be compared, and it can be easily determined whether or not the two match, by using the position and dimensions (width) of the buried object included in the search information in the scanning direction, and the dimensional information about the buried object included in the construction information.

The buried object information management device according to the fourth invention is the buried object information management device according to the first or second invention, wherein the collation unit collates the search information with the construction information by subjecting the search image including the buried object to pattern matching with drawings included in the construction information.

Consequently, a search image including a buried object included in the search information can be subjected to pattern matching with the drawings included in the construction information to compare and the position and size of the buried object, making it easy to determine whether or not there is a match.

The buried object information management device according to the fifth invention is the buried object information management device according to the fourth invention, wherein the collation unit collates the search information with the construction information by subjecting the search image to pattern matching with substantially the entire drawing included in the construction information.

Consequently, it can be determined whether or not the position of the buried object included in the search image matches the layout on a drawing by subjecting the entire search image acquired from the buried object scanning device and the entire drawing included in the construction information to collation and pattern matching.

As a result, it is possible to detect the size (dimensions), type, etc., of the buried object included in a search image that matches the layout on a drawing.

The buried object information management device according to the sixth invention is the buried object information management device according to the fourth invention, wherein the collation unit collates the search information with the construction information by subjecting the search image to pattern matching with the characteristic portion of a part of the drawing included in the construction information.

Consequently, it can be determined whether or not the a buried object included in the search image matches a drawing by subjecting a characteristic portion of the search image acquired from the buried object scanning device and the corresponding portion of the drawing included in the construction information to collation and pattern matching.

As a result, a part of the image including the characteristic layout of the buried object included in the search image can be used to detect the size (dimensions), type, etc., of the buried object included in the search image that matches the layout on the drawing.

The buried object information management device according to the seventh invention is the buried object information management device according to any of the first to sixth inventions, further comprising a material estimation unit that estimates the type of buried object when the result of collation by the collation unit is that the search information matches the construction information.

Consequently, if the result of collation is that the layout of the buried object is the same in the search image and in the drawing, the type of the buried object (for example, the material, the type of lumber, etc.) included in the search image can be estimated on the basis of the construction information including the drawing.

The buried object information management device according to the eighth invention is the buried object information management device according to the seventh invention, wherein the material estimation unit estimates the type of buried object on the basis of position information and/or dimensional information about the buried object included in the search information.

Consequently, if the result of collation is that the layout of the buried object is the same in the search image and in the drawing, the position information and dimensional information about the buried object included in the search information can be applied to the corresponding buried object in the search image, and the type of buried object can be estimated.

The buried object information management device according to the ninth invention is the buried object information management device according to the seventh or eighth invention, further comprising a buried object information memory unit that stores a buried object table including information about a plurality of types of buried object estimated by the material estimation unit.

Consequently, if the result of collation is that the layout of the buried object is the same in the search image and in the drawing, the type of buried object at the corresponding position can be estimated by referring to the buried object table containing information about multiple types of buried object.

The buried object information management device according to the tenth invention is the buried object information management device according to the ninth invention, further comprising a dimension estimation unit that estimates the depth dimension of the buried object by referring to the buried object table stored in the buried object information memory unit, on the basis of the type of the buried object estimated by the material estimation unit.

Normally, when the surface of a target is scanned by a buried object scanning device, only the width dimension (the dimension in the scanning direction) of the buried object in the target can be detected, and the depth (thickness) dimension of the buried object perpendicular to the scanning direction cannot be detected.

Consequently, if the result of collation is that the layout of the buried object is the same in the search image as in drawing, depth dimension (intersecting the scanning direction of the buried object scanning device) information can be estimated by referring to the buried object table containing information about the estimated type of buried object.

The buried object information management device according to the eleventh invention is a buried object information management device according to any of the first to tenth inventions, further comprising an information memory unit for storing the search information acquired by the acquisition unit and the construction information inputted to the input unit.

Consequently, the search information and construction information stored in the information memory unit can be used to collate the above-mentioned search image with the drawing included in the construction information.

The buried object information management device according to the twelfth invention is the buried object information management device according to the eleventh invention, further comprising an information call-up unit and a first display control unit. The information call-up unit calls up arbitrary information from the search information and the construction information stored in the search information memory unit. The first display control unit causes a display unit to display the information called up by the information call-up unit.

Consequently, search information such as the search image called up from the search information memory unit and construction information are displayed on the display unit, so the worker who will perform the construction work, the construction manager, or the like can check the search information and construction information while also easily checking the position and size of the buried object contained in the actual target.

The buried object information management device according to the thirteenth invention is the buried object information management device according to the twelfth invention, wherein the first display control unit controls the first display unit so as to display position information about the buried object, whose origin is the starting point of the scan included in the search image, as the search information.

Consequently, the position and size of the buried object are displayed on the first display unit starting from the reference point at which the scanning of the buried object scanning device is started, which makes it easy for a worker, etc., to recognize the position where the buried object is located with respect to the actual target.

The buried object information management device according to the fourteenth invention is the buried object information management device according to any of the first to thirteenth inventions, wherein the construction information includes information about at least one of the following: the name and dimensions of the buried object that is the target, and the position, type, pitch, and number of screws to be used.

Consequently, collation with the search image, reflecting information in the search image, and so forth can be performed by using construction information including the name and dimensions of the buried object that is the target, the position, type, pitch, and number of screws to be used, and so on.

The buried object information management system according to the fifteenth invention comprises the buried object information management device according to any of claims 1 to 14, and a buried object scanning device including a data transfer unit that transfers the search image to the acquisition unit of the buried object information management device.

Consequently, the search image can be saved as search information in the buried object information management device that has received a search image from the data transfer unit of the buried object scanning device.

The buried object information management system according to the sixteenth invention is the buried object information management system according to the fifteenth invention, wherein the buried object scanning device has a detection unit that detects the presence or absence of the buried object, a search image conversion processing unit that converts the detection result from the detection unit into the search image, a memory unit that stores the search image and a grid layer including grid lines corresponding to a predetermined scale, and a second display unit that displays the search image and the grid layer.

Consequently, in a buried object scanning device that detects buried objects such as wood and rebar contained in a target such as a wall or concrete, for example, the search image converted from the detection result in the detection unit and a grid layer including grid lines can be displayed on the second display unit in a state of being superimposed.

The buried object information management system according to the seventeenth invention is the buried object information management system according to the sixteenth invention, wherein the buried object scanning device further has an operation input unit to which various operations are inputted, and a second display control unit that controls the second display unit so that the search image and the grid layer are displayed superimposed, and the search image is displayed in a state of being able to move relative to the grid layer in response to input to the operation input unit.

Consequently, in a buried object scanning device, a search image can be displayed in a state of being movable relative to the grid layer in response to input to the operation input unit.

Therefore, by moving the search image and the grid layer relative to each other so that the position serving as the reference point matches up with the grid lines, for example, the spacing between the grid lines can be checked, which makes it easy to check the distance from the position serving as the reference point to the position of the buried object on the display screen of the display unit without having to mark the wall surface.

As a result, no marking work is necessary during buried object search, and this lessens the burden on the worker.

The buried object information management method according to the eighteenth invention is a buried object information management method for managing information about a buried object included in a search image showing the presence or absence of the buried object in a target generated by a buried object scanning device that is scanned along the target, said method comprising an acquisition step, an input step, and a collation step. The acquisition step involves acquiring search information including the search image generated by the buried object scanning device. The input step involves inputting construction information including position information about the buried object in the target. The collation step involves collating the search information acquired in the acquisition step with the construction information inputted in the input step, and determining whether or not there is a match.

Here, this buried object information management method is carried out, for example, on a PC (personal computer) used by a manager who manages a construction site, or a smartphone, tablet terminal, or the like owned by a worker. This buried object information management method may also be carried out in a buried object scanning device that acquires search information.

In addition to the search image, the search information acquired in the buried object search method includes, for example, dimensional (width) information in the scanning direction of the buried object included in the search image, the distance from the scanning start point (reference point) to the buried object, the distance between buried objects, and other such information.

The construction information inputted in the input step includes, for example, dimensional information related to the position and size of the buried object contained in the target, the screwing position to the buried object used in construction, and the type, size, and number of screws.

Also, the construction information may be inputted when collation is performed by the collation unit, or may be information previously inputted and stored as collation information.

Consequently, if collation of the acquired search information and the inputted construction information indicates a match, the dimensions, type, and so forth of the detected buried object can be identified by referring to the buried object information included in the construction information, for example.

As a result, it is possible to identify whether the detected buried object is a through-pillar, stand pillar, stud, beam, brace, joist, furring strip, or other such piece of lumber, and this information can be utilized in subsequent construction work such as screwing and drilling.

The buried object information management program according to the nineteenth invention is a buried object information management program that manages information about a buried object included in a search image showing the presence or absence of the buried object in a target generated by a buried object scanning device that is scanned along the target, said buried object information management program causing a computer to execute a buried object information management method comprising an acquisition step, an input step, and a collation step. The acquisition step involves acquiring search information including the search image generated by the buried object scanning device. The input step involves inputting construction information including position information about the buried object in the target. The collation step involves collating the search information acquired in the acquisition step with the construction information inputted in the input step, and determining whether or not there is a match.

Here, this buried object information management method is carried out, for example, on a PC (personal computer) used by a manager who manages a construction site, or a smartphone, tablet terminal, or the like owned by a worker. This buried object information management method may also be carried out in a buried object scanning device that acquires search information.

In addition to the search image, the search information acquired in the buried object search method includes, for example, dimensional (width) information in the scanning direction of the buried object included in the search image, the distance from the scanning start point (reference point) to the buried object, the distance between buried objects, and other such information.

The construction information inputted in the input step includes, for example, dimensional information related to the position and size of the buried object contained in the target, the screwing position to the buried object used in construction, and the type, size, and number of screws.

Also, the construction information may be inputted when collation is performed by the collation unit, or may be information previously inputted and stored as collation information.

Consequently, if collation of the acquired search information and the inputted construction information indicates a match, the dimensions, type, and so forth of the detected buried object can be identified by referring to the buried object information included in the construction information, for example.

As a result, it is possible to identify whether the detected buried object is a through-pillar, stand pillar, stud, beam, brace, joist, furring strip, or other such piece of lumber, and this information can be utilized in subsequent construction work such as screwing and drilling.

Effects

With to the buried object information management device according to the present invention, the type of buried object installed in a target can be identified.

BRIEF DESCRIPTION OF THE DRAWINGS

FIG. 11 shows a buried object table stored in the memory unit of the buried object information management unit of the buried object scanning device in FIG. 3;

FIG. 12 shows an acquired data storage table stored in the memory unit of the buried object scanning device in FIG. 3;

FIG. 13 shows the display buffer area stored in the memory unit of the buried object scanning device in FIG. 3;

FIG. 14 shows the search image storage table stored in the memory unit of the buried object scanning device in FIG. 3;

DETAILED DESCRIPTION

The buried object information management system 1 including the buried object information management unit (buried object information management device) 26 according to an embodiment of the present invention will now be described with reference to FIGS. 1 to 31.

(1) Configuration of Buried Object Information Management System 1

Figure 1:
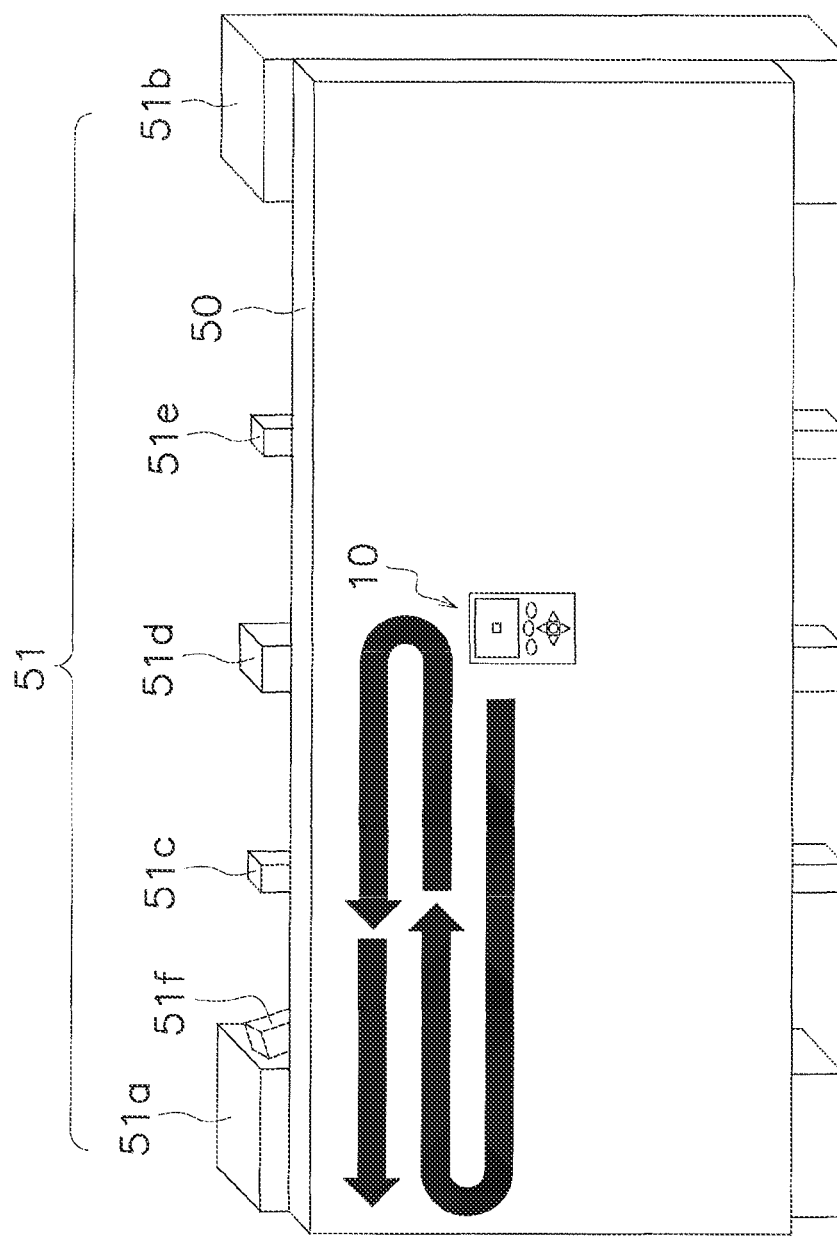
FIG. 1 is a diagram showing the state when a buried object scanning device is scanned along a wall surface in order to detect buried objects in the wall surface by using the buried object scanning device included in the dimensional information management system according to an embodiment of this invention.
Figure 3:
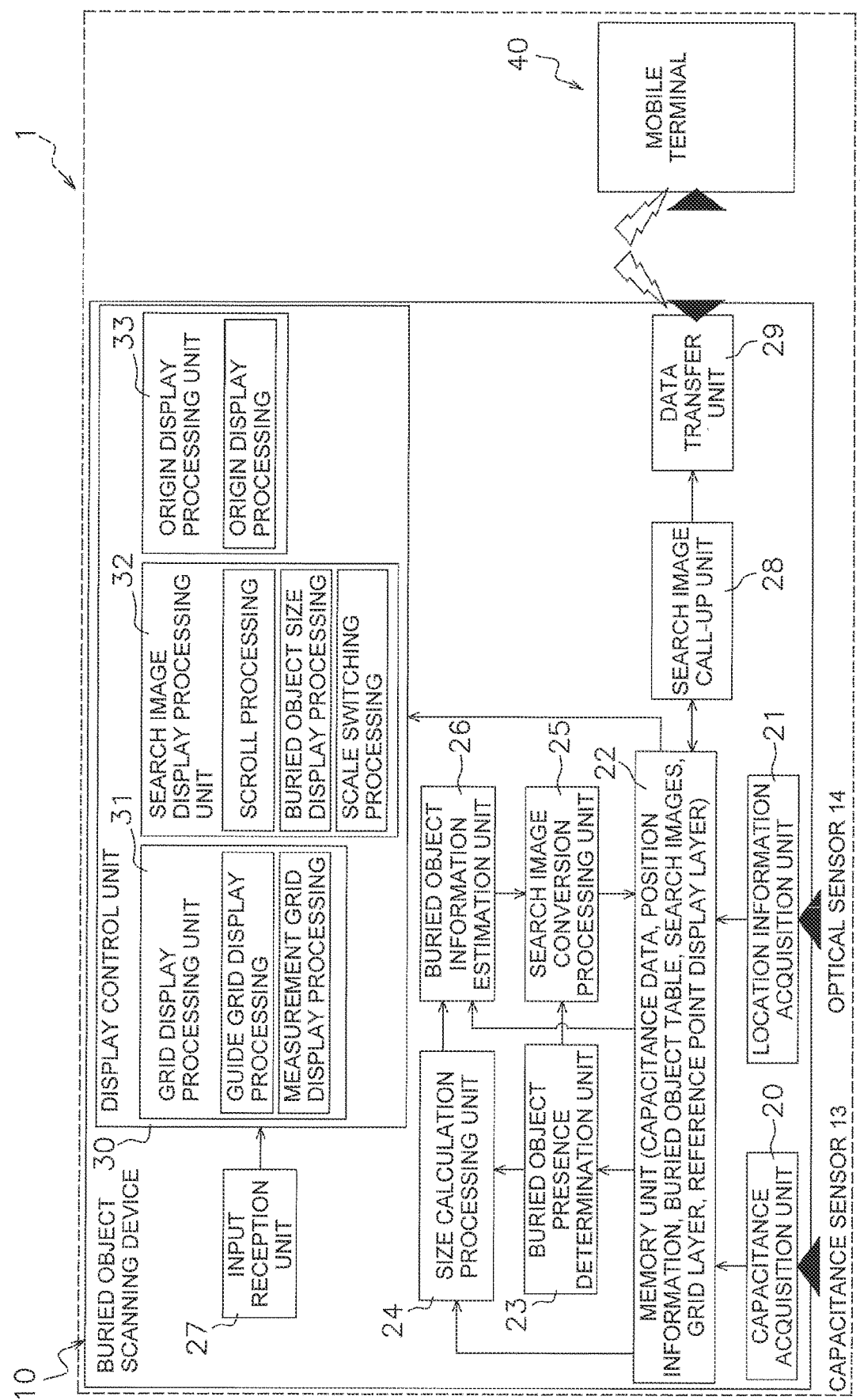
FIG. 3 is a control block diagram showing the internal configuration of the buried object scanning device included in the dimensional information management system in FIG. 1.

As shown in FIG. 1, the buried object information management system 1 according to this embodiment comprises a buried object scanning device 10 and a mobile terminal 40 (see FIG. 3).

As shown in FIG. 1, the buried object scanning device 10 detects a change in capacitance with a capacitance sensor 13 (see FIG. 3; discussed below) while moving along a wall surface (target) 50, and thereby detects buried objects 51 made of wood (through-pillars 51a and 51b, studs 51c and 51e, stand pillar 51d, brace 51f, etc.), metal, or the like and contained in the wall surface 50.

The mobile terminal 40 is, for example, a smartphone owned by a worker or the like at a construction site, and as shown in FIG. 3, communicates with the buried object scanning device 10 and receives search information related to the buried object 51 within the wall surface 50 from the buried object scanning device 10, and displays the position, size, type, and other such information about the buried object 51.

(2) Configuration of Buried Object Scanning Device 10

Figure 2:
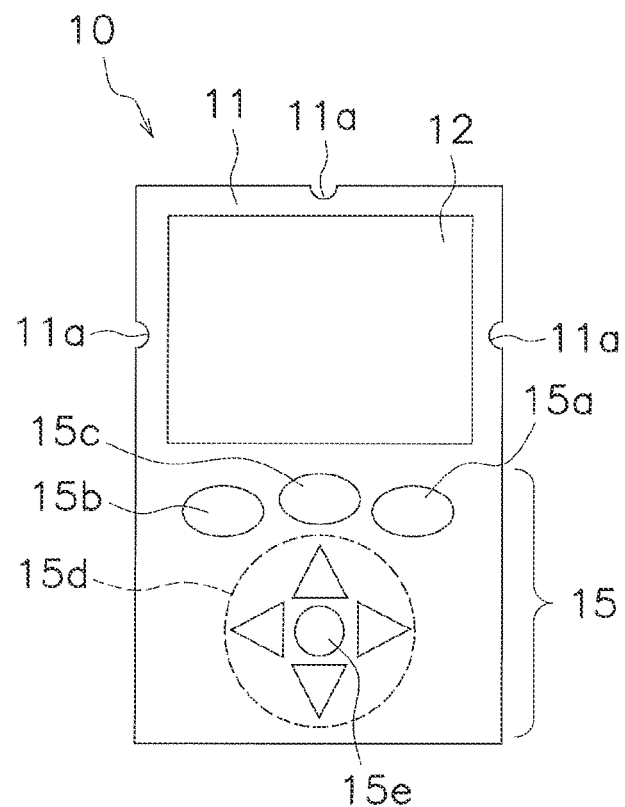
FIG. 2 is an external view of the configuration of the buried object scanning device in FIG. 1.

As shown in FIG. 2, the buried object scanning device 10 comprises a main body 11, a display unit 12, a capacitance sensor 13 (see FIG. 3), an optical sensor 14 (see FIG. 3), and an operation input unit 15.

The wall surface 50 includes, for example, wallpaper or other such decorative material applied to drywall or a plywood surface. Also, the buried object 51 includes, for example, the through-pillars 51a and 51b, the studs 51c and 51e, the stand pillar 51d, the brace 51f, and other such wooden materials, metal frames, and so forth.

As shown in FIG. 2, the main body 11 is a resin member having a substantially cuboid shape, and the display unit 12 and the operation input unit 15 are provided on the side (front) facing the user during use. The capacitance sensor 13 and the optical sensor 14 are provided on the side (back) that is on the wall surface 50 side (the opposite side from the user).

Recesses 11a are provided on the upper end surface and the left and right end surfaces of the main body 11. These recesses 11a are used for marking the scanning start point on the wall surface 50 with a pen or the like when scanning the wall surface 50 with the buried object scanning device 10, for example.

As shown in FIG. 2, the display unit 12 is a liquid crystal display device, for example, and is disposed on the front of the main body 11. The display unit 12 displays, for example, the settings of the buried object scanning device 10, a search image showing the detection result for the buried object 51, and so forth, and what is displayed is switched according to the operation content inputted to the operation input unit 15.

The capacitance sensor 13 is disposed on the back of the main body 11, and is a sensor that senses changes in capacitance when the buried object scanning device 10 is moved along the wall surface 50, and is used to detect a buried object 51 located within the wall surface 50.

The optical sensor 14 is disposed on the back of the main body 11, and receives reflected infrared light emitted onto the wall surface 50, for example, to acquire position information about the buried object scanning device 10.

As shown in FIG. 2, the operation input unit 15 is disposed on the front of the main body 11. The operation input unit 15 includes a power button 15a, a grid display button 15b, a scale switching button 15c, a D-pad 15d, and an enter button 15e.

The power button 15a is disposed on the upper-right side of the operation input unit 15. For example, holding this button down turns the power of the buried object scanning device 10 on or off.

The grid display button 15b is disposed on the upper-left side of the operation input unit 15, and is pressed when a grid layer, in which a plurality of grid lines (discussed below) are arranged in a grid pattern, is displayed superimposed with the search image on the display screen 12a of the display unit 12. Also, when the grid display button 15b is pressed again in a state in which the grid layer is superimposed with the search image and displayed on the display screen 12a, a measurement grid (grid lines) is displayed on the display screen 12a.

The scale switching button 15c is disposed in the upper center part of the operation input unit 15, and is pressed, for example, when the superimposed display of the search image and the grid layer is enlarged.

The D-pad 15d is disposed at the lower part of the operation input unit 15, and allows operations to be inputted in four directions: up, down, left, and right. When the D-pad 15d is operated up, down, left, or right in a state in which the grid layer including the grid lines is superimposed with the search image, for example, the search image is moved relative to the grid layer.

The enter button 15e is disposed in the center position of the D-pad 15d, and is pressed when executing a command or the like selected using the D-pad 15d, etc.

Also, as shown in FIG. 3, the buried object scanning device 10 comprises a capacitance acquisition unit 20, a position information acquisition unit 21, a memory unit 22, a buried object presence determination unit 23, a size calculation processing unit 24, a search image conversion processing unit 25, a buried object information management unit 26, an input receiving unit 27, a search image call-up unit 28, a data transfer unit 29, and a display control unit 30, all provided inside the main body 11.

The capacitance acquisition unit 20, the position information acquisition unit 21, the memory unit 22, the buried object presence determination unit 23, the size calculation processing unit 24, the search image conversion processing unit 25, the buried object information management unit 26, the input receiving unit 27, the search image call-up unit 28, the data transfer unit 29, and the display control unit 30 provided inside the buried object scanning device 10 are generated when the CPU reads various control programs stored in the memory.

The capacitance acquisition unit 20 acquires the output from the capacitance sensor 13 disposed on the rear side of the main body 11, and transmits this output to the memory unit 22.

More precisely, the capacitance acquisition unit 20 senses changes in capacitance in order to determine if the buried object 51 is present within the range of movement every time the buried object scanning device 10 reaches a specific movement amount along the wall surface 50, using the position information acquired by the position information acquisition unit 21. Consequently, the search image conversion processing unit 25 (discussed below) can generate a search image in the movement area for each specific movement amount by using the output results from the capacitance sensor 13.

The position information acquisition unit 21 acquires the output from the optical sensor 14 disposed on the rear side of the main body 11, and transmits this output to the memory unit 22. Consequently, the buried object scanning device 10 can sense the position on the wall surface 50 and the amount of movement on the basis of the position information acquired by the position information acquisition unit 21.

The memory unit 22 stores the capacitance data received from the capacitance acquisition unit 20, the position information data received from the position information acquisition unit 21, search images converted from the capacitance data in the search image conversion processing unit 25, a grid layer displayed superimposed with a search image, a reference point display layer, and the like. The memory unit 22 transmits a search image called up by the search image call-up unit 28, etc., to the data transfer unit 29 and the display control unit 30.

The search images stored in the memory unit 22 are stored together with information about the time at which the wall surface 50 was scanned, in a state of being grouped in units of one scan. In this embodiment, search images corresponding to a plurality of scans are stored in the memory unit 22.

Also, search images converted for each specific movement amount are accumulated and stored after the power is turned on to the buried object scanning device 10, and a plurality of search images are stored in a state of being grouped in units of a single scan.

The buried object presence determination unit 23 determines whether a buried object 51 is present in the wall surface 50 (edge determination processing) according to whether or not the output signal (capacitance data) of the capacitance sensor 13 has exceeded a specific threshold value. This makes it possible to determine whether a buried object 51 is present on the basis of the output result of the capacitance sensor 13.

The size calculation processing unit 24 calculates an estimated value of the size (width, etc.) of the buried object 51 in the wall surface 50 on the basis of the output signal (capacitance data) of the capacitance sensor 13. More specifically, the size calculation processing unit 24 detects the edge portions at both ends where the output signal of the capacitance sensor 13 has changed, and calculates the estimated value of the size with the space between the edges as the buried object 51.

The search image conversion processing unit 25 converts the output signal of the capacitance sensor 13 into a search image indicating the presence or absence of a buried object 51. More precisely, the search image conversion processing unit 25 generates a search image by using the capacitance data acquired each time the amount of movement of the buried object scanning device 10 along the wall surface 50 reaches a specific distance, on the basis of the position information for the buried object scanning device 10 sensed by the above-mentioned position information acquisition unit 21.

The buried object information management unit 26 compares the estimated value of the size (width) of the buried object 51 in the scanning direction calculated by the size calculation processing unit 24, with the width of each type of buried object 51 included in the buried object table (see FIG. 11) stored in the memory unit 22, and estimates the corresponding type of the buried object 51, the depth dimension (thickness), and the like.

The detailed configuration of the buried object information management unit 26 will be described in detail below.

The input receiving unit 27 receives the operation inputted by the user to the operation input unit 15, including the above-mentioned power button 15a, grid display button 15b, scale switching button 15c, D-pad 15d, and so on.

The search image call-up unit 28 calls up a search image stored in the memory unit 22 on the basis of the user operation inputted to the operation input unit 15, for example, and transmits this image to the data transfer unit 29 or the display control unit 30.

The display control unit 30 may control the display unit 12 so that after a search image is stored in the memory unit 22, it is displayed in real time during scanning, regardless of the operation inputted by the user to the operation input unit 15.

As shown in FIG. 3, the data transfer unit 29 transmits search images, the detection result for a buried object 51, and other such search information, and the type, dimensions, etc., of the buried object estimated by the buried object information management unit 26 to the mobile terminal 40, such as a smartphone or the like owned by a worker, etc.

Although FIG. 3 shows that the search information is transmitted from the data transfer unit 29 of the buried object scanning device 10 to the single mobile terminal 40, there may be a plurality of mobile terminals 40 to which search information is transmitted from the data transfer unit 29 of the buried object scanning device 10.

Consequently, for example, a plurality of workers look at the construction site can look at the display screen of the smartphone or other such mobile terminal 40 to check the search image, the detection result for the buried object 51, or other such search information, and the type, dimensions, etc., of the buried object estimated by the buried object information management unit 26.

The display control unit 30 causes the display screen 12a of the display unit 12 to display a search image (see FIG. 4, etc.) indicating the presence or absence of a buried object 51 generated by the above-mentioned search image conversion processing unit 25. Furthermore, the display control unit 30 causes the display screen 12a of the display unit 12 to display the search image superimposed with the grid layer and the reference point display layer stored in the memory unit 22.

Figure 4:
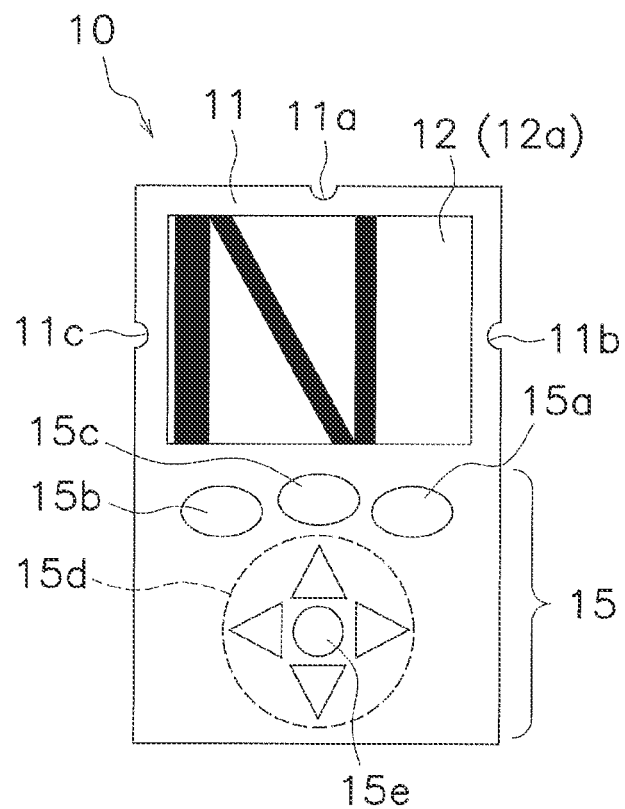
FIG. 4 is a diagram showing the display screen of the display unit when the buried object scanning device in FIG. 3 is scanned over a wall surface.

In a search image, as shown in FIG. 4, images generated from the capacitance data acquired along the path of the buried object scanning device 10 scanned over the wall surface 50 are used to display whether or not a buried object 51 is present.

As shown in FIG. 3, the display control unit 30 also has a grid display processing unit 31, a search image display processing unit 32, and an origin display processing unit 33.

The grid display processing unit 31 performs display processing so that a grid layer including a plurality of grid lines, or a grid layer including a measurement grid (grid lines) prepared for displaying the size of the buried object 51, the distance to the buried object 51, and so forth in an easy-to-understand manner, is superimposed on the search image.

The search image display processing unit 32 performs scroll processing to move the search image with respect to the grid layer (fixed display) on the display screen 12a of the display unit 12, and causes the display screen 12a to display the size of the buried object 51 included in the search image. Furthermore, the search image display processing unit 32 performs processing to switch the display scale of the search image displayed on the display screen 12a.

The origin display processing unit 33 performs processing to display a reference point P1 on the grid layer displayed superimposed with the search image on the display screen 12a.

The grid layer is a display layer (see FIG. 20A, etc.) including a plurality of grid lines arranged in a grid pattern, and is displayed superimposed on a search image showing whether or not a buried object 51 is present. The display control unit 30 causes the display unit 12 to display the search image in a state of being movable with respect to the grid layer.

In the reference point display layer, for example, the reference point P1 (see FIG. 18, etc.) indicating the scanning start point is displayed on the display screen 12a of the display unit 12, superimposed on the search image and the grid layer. The reference point display layer is displayed superimposed on the search image and the grid layer in a state of being able to move with respect to the grid layer (fixed display), similarly to the search image (see FIG. 20B).

The display control of the display unit 12 by the display control unit 30 will be described in detail below.

Generation to Storage of Search Images

With the buried object scanning device 10 in this embodiment, the wall surface 50 is scanned with the above configuration, and as a result, a search image indicating the presence or absence of a buried object 51 in the wall surface 50 is generated on the basis of the change in capacitance thus obtained.

Figure 5:
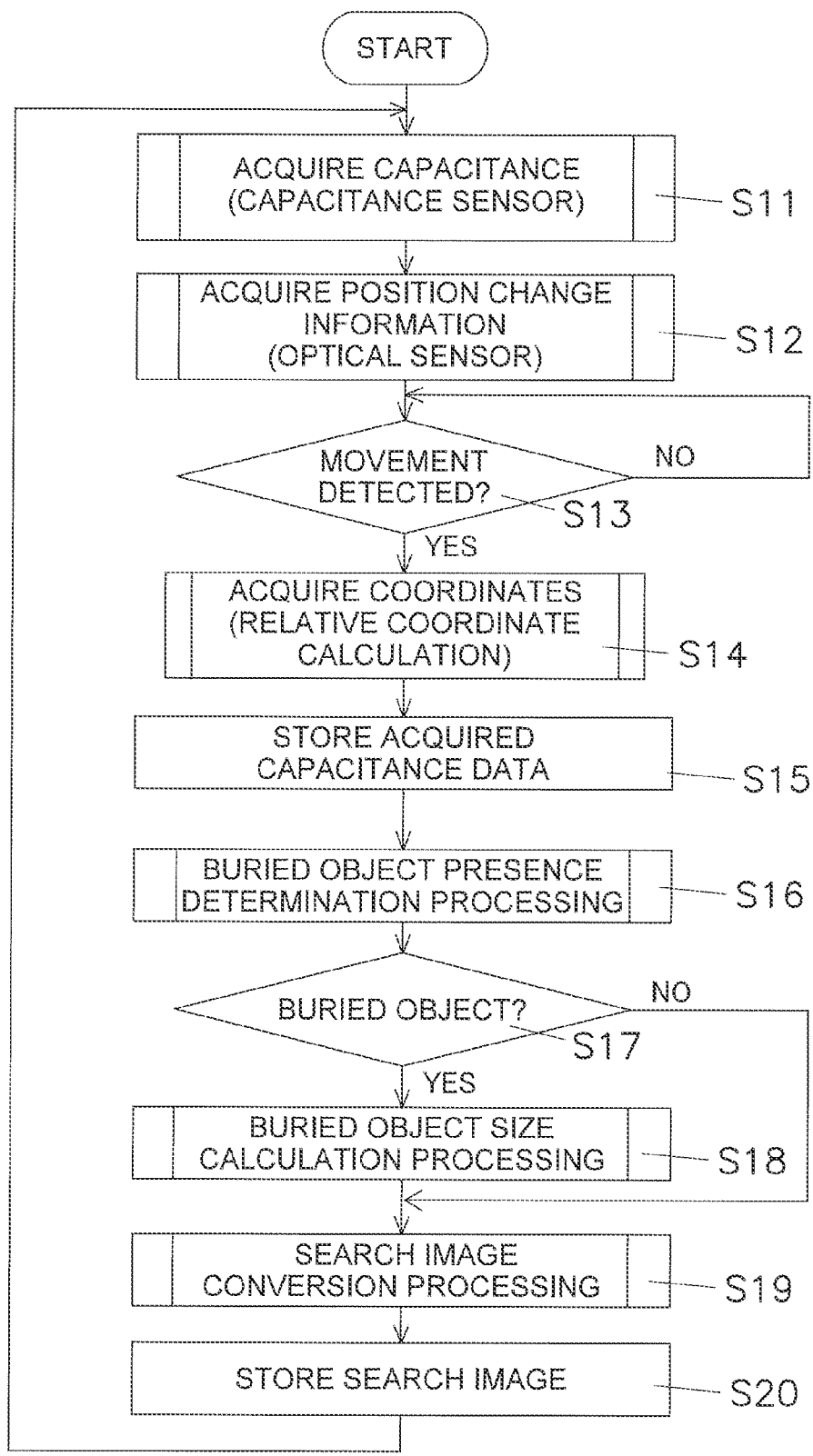
FIG. 5 is a flowchart showing the flow of search image generation and storage processing in the buried object scanning device in FIG. 3.

Here, the processing to generate a search image will be described below using the flowchart in FIG. 5.

In step S11, the capacitance acquisition unit 20 acquires the capacitance sensed by the capacitance sensor 13.

Next, in step S12, the position information acquisition unit 21 acquires the position information about the buried object scanning device 10 sensed by the optical sensor 14.

Next, in step S13, it is determined, from the position information about the buried object scanning device 10 acquired by the position information acquisition unit 21, whether or not the buried object scanning device 10 has moved along the wall surface 50. If it is determined that the device has moved, the processing proceeds to step S14, and if it is determined that the device has not moved, step S13 is repeated until it is determined that the device has moved.

Next, in step S14, since it was determined in step S13 that the buried object scanning device 10 has moved, the coordinates (relative coordinates) indicating the current position of the buried object scanning device 10 are calculated and acquired.

Next, in step S15, the coordinates of the current position of the buried object scanning device 10 calculated and acquired in step S14 are calculated and acquired as relative coordinates, and the processing proceeds to step S16.

Consequently, for example, every time the position information acquisition unit 21 detects that the position of the buried object scanning device 10 sensed by the optical sensor 14 has reached a specific movement amount, the capacitance data acquired by the capacitance acquisition unit 20 can be saved.

Next, in step S16, the buried object presence determination unit 23 performs processing to determine whether or not a buried object 51 is present in the scanning range on the basis of the acquired capacitance data.

Next, in step S17, the presence determination unit 23 determines whether or not a buried object 51 is present, and if there is one, the processing proceeds to step S18, and if not, the processing proceeds to step S19.

Next, in step S18, since it was determined in step S17 that there is a buried object 51, the size calculation processing unit 24 calculates the estimated value of the size (width) of the buried object 51 in the scanning direction of the buried object scanning device 10.

Next, in step S19, the search image conversion processing unit 25 performs processing to convert the capacitance data acquired by the capacitance acquisition unit 20 into a search image, regardless of the presence or absence of a buried object 51.

Next, in step S20, the search image generated in step S19 is stored in the memory unit 22.

In this embodiment, a search image is generated using the capacitance data sensed by the capacitance sensor 13 and is stored in the memory unit 22 in the above steps.

From Start of Scanning to Image Storage

Next, the steps from the start of scanning along the wall surface 50 to the storage processing of the search image in the buried object scanning device 10 of this embodiment will be described using the flowcharts in FIGS. 6 to 10.

(a) Coordinate Acquisition Processing

The coordinate acquisition processing in S14 of FIG. 5 performed by the buried object scanning device 10 in this embodiment will now be described in detail with reference to the flowchart of FIG. 6.

Figure 6:
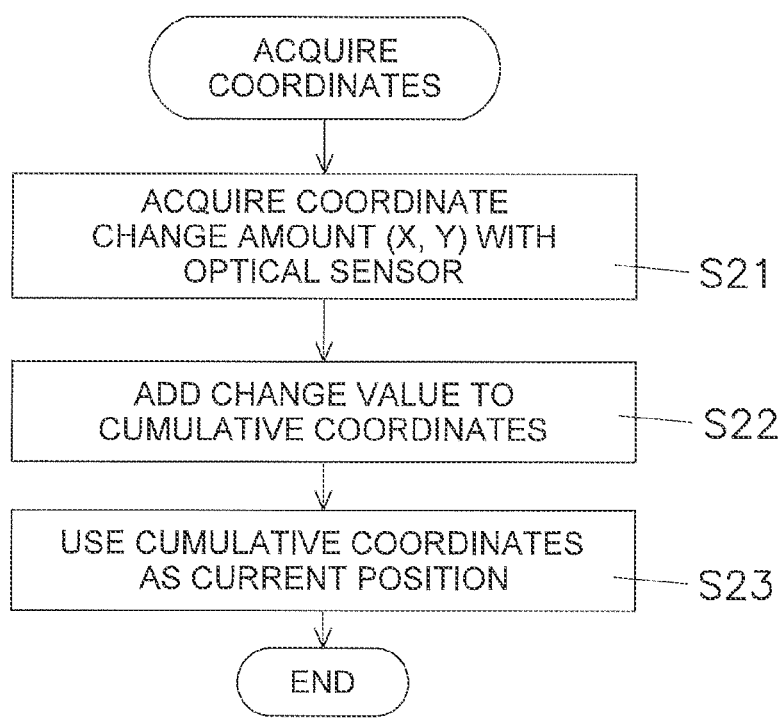
FIG. 6 is a flowchart showing the flow of the coordinate acquisition processing during scanning with the buried object scanning device in FIG. 3.

In this embodiment, when scanning along the wall surface 50 is started with the buried object scanning device 10, in step S21 the position information sensed by the optical sensor 14 is acquired as a coordinate change amount (X, Y), as shown in FIG. 6.

Next, in step S22, the coordinate change amount acquired in step S21 is added to the cumulative coordinates.

Next, in step S23, the cumulative coordinates obtained in step S22 are set as the current position of the buried object scanning device 10.

(b) Buried Object Presence Determination Processing

The processing to determine the presence of a buried object 51 in S17 of FIG. 5 performed by the buried object scanning device 10 in this embodiment will now be described in detail with reference to the flowchart of FIG. 7.

First, in step S31, the amount of change in the sensed result of the capacitance sensed by the capacitance sensor 13 is calculated as a determination value.

Next, in step S32, it is determined whether or not the determination value is equal to or greater than a specific threshold value. If the determination value is equal to or greater than the specific threshold value, the processing proceeds to step S33, and otherwise the processing proceeds to step S34.

Next, in step S33, since it was determined in step S32 that the determination value is equal to or greater than a specific threshold value, it is determined that there is a buried object 51 in the scanning area, and the processing ends.

On the other hand, in step S34, since it was determined in step S32 that the determination value is less than the specific threshold value, it is determined that there is no buried object 51 in the scanning area, and the processing ends.

(c) Buried Object Estimation Processing

Figure 8:
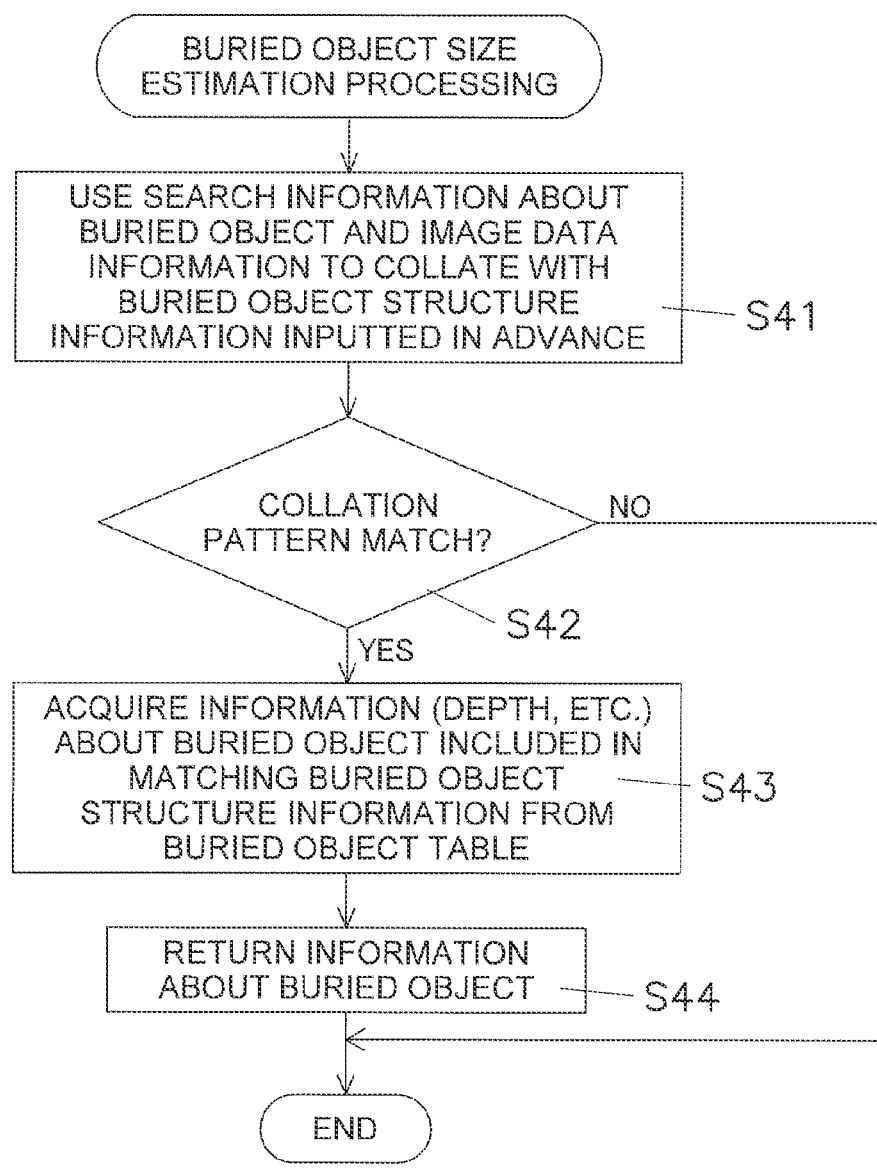
FIG. 8 is a flowchart showing the flow of processing to estimate the dimensions of a buried object included in the search image with the buried object scanning device in FIG. 3.

The processing to estimate the buried object 51 in S18 of FIG. 5 carried out by the buried object scanning device 10 in this embodiment will now be described in detail with reference to the flowchart of FIG. 8.

First, in step S41, the search information about the buried object 51 and the image data information (buried object structure information) are used to collate with buried object structure information inputted in advance.

Next, in step S42, it is determined whether or not the collated search information and image data information (buried object structure information) match.

Here, if the collated patterns match, the processing proceeds to step S43, and if they do not match, the processing ends.

Next, in step S43, the dimensional information (depth dimension, etc.) about the buried object 51 included in the matching buried object structure information is acquired from the buried object table (see FIG. 11).

Next, in step S44, the information about the buried object 51 is returned.

Consequently, a worker at the construction site, for example, can check the position, depth dimension, and so forth of the buried object 51 on the display screen of the buried object scanning device 10, or on the display screen of the mobile terminal 40 that has received the position, depth dimension, and other such information about the buried object 51 from the buried object scanning device 10.

Consequently, since the construction work can be performed after ascertaining the thickness dimension (shape) of the buried object 51 in the depth direction, it is possible to prevent the occurrence of problems such as penetration or breakage of the buried object 51.

The details of the dimension estimation processing for the buried object 51 performed by the buried object information management unit 26 of the buried object scanning device 10 will be described below.

(d) Search Image Conversion Processing

Figure 9:
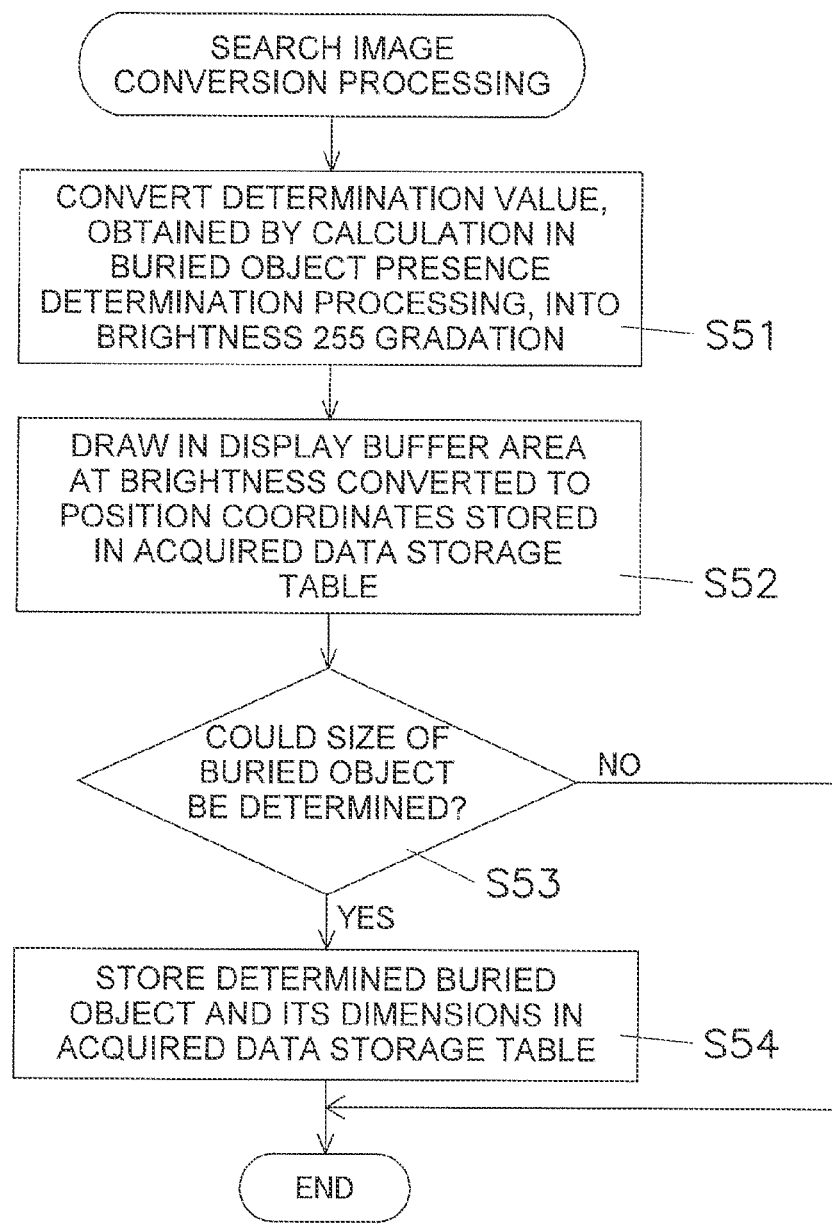
FIG. 9 is a flowchart showing the flow of the search image conversion processing in the buried object scanning device in FIG. 3.

The search image conversion processing in S19 of FIG. 5 carried out by the buried object scanning device 10 of this embodiment will now be described in detail with reference to the flowchart of FIG. 9.

Figure 7:
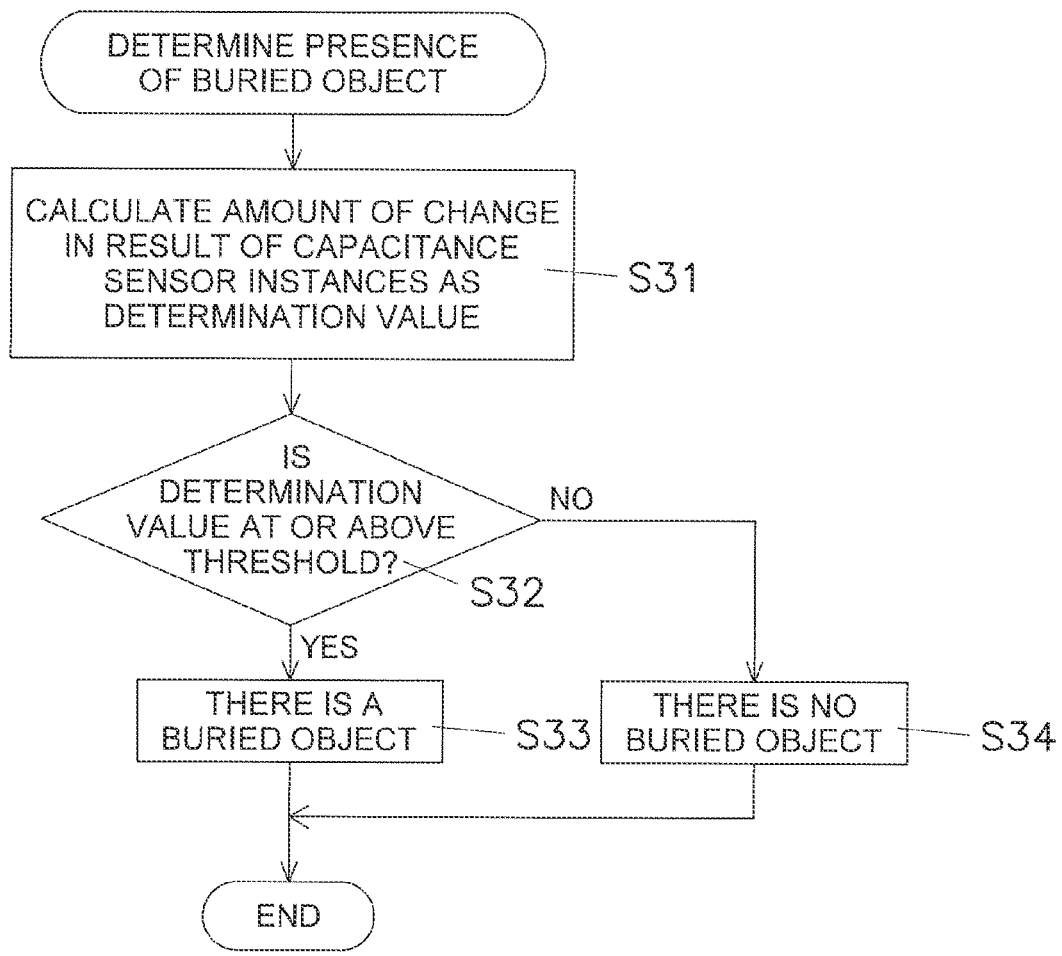
FIG. 7 is a flowchart showing the flow of processing to determine the presence or absence of a buried object with the buried object scanning device in FIG. 3.

First, in step S51, the amount of change (determination value) in the sensed result of the capacitance sensor calculated in S31 of the buried object presence determination processing shown in FIG. 7 is converted into a brightness 255 gradation.

Next, in step S52, a search image is generated by drawing in the display buffer area at the brightness converted to the position coordinates included in the acquired data storage table shown in FIG. 12.

As shown in FIG. 13, the coordinates (X, Y) and the corresponding R, G, and B values are stored in the display buffer area.

Next, in step S53, it is determined whether or not the size of the buried object 51 could be determined. Here, if the size could be determined, the processing proceeds to step S54, and if the size could not be determined, the processing ends.

Next, in step S54, the buried object 51 whose size has been determined and its size (in the scanning direction) are stored in the acquired data storage table shown in FIG. 12, and the processing is ended.

(e) Search Image Storage Processing

Figure 10:
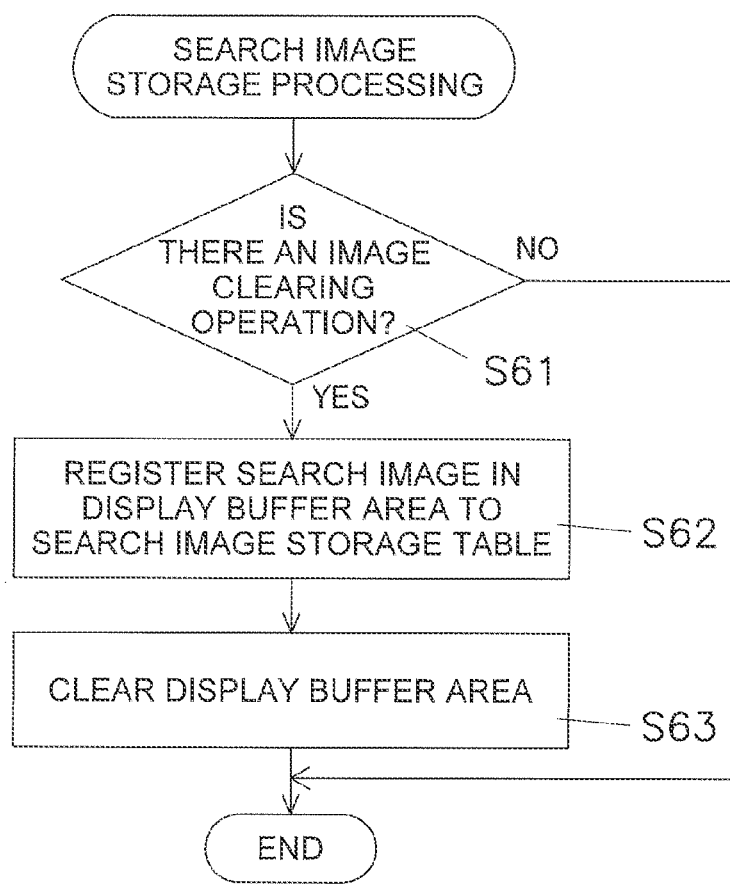
FIG. 10 is a flowchart showing the flow of search image storage processing in the buried object scanning device in FIG. 3.

The search image storage processing in S20 of FIG. 5 carried out by the buried object scanning device 10 of this embodiment will now be described in detail with reference to the flowchart of FIG. 10.

First, in step S61, it is determined whether or not an image clearing operation has been received, such as pressing of the search start button by the user.

Here, if an image clearing operation has been received, the processing proceeds to step S62, and otherwise the processing ends at that point.

Next, in step S62, the search image in the display buffer area shown in FIG. 13 is registered in the search image storage table shown in FIG. 14 before the screen is cleared.

Here, as shown in FIG. 14, the search image storage table is stored in a state in which the date and time when the search image was generated and the image data ID attached to each search image are associated with each other. The search images stored in the search image storage table are each stored as image data corresponding to one operation.

Next, in step S63, the display buffer area is cleared and the processing ends. Display Control Method of Buried Object Scanning Device 10

The display control method of the buried object scanning device 10 in this embodiment will now be described with reference to FIGS. 15 to 25.

(a) Startup and Preparation

Figure 15:
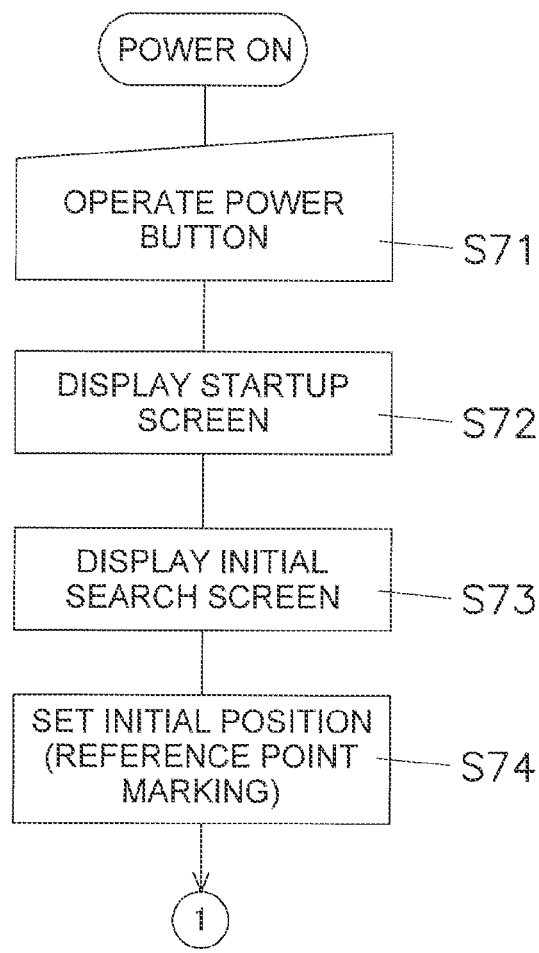
FIG. 15 is a flowchart of the flow of processing in the display control method of the buried object scanning device in FIG. 3.

First, as shown in FIG. 15, if the user operates (holds down) the power button 15a in step S71, then in step S72 the display control unit 30 causes the display screen 12a of the buried object scanning device 10 to display a startup screen.

Next, in step S73, the display control unit 30 causes the display screen 12a of the buried object scanning device 10 to display the initial search screen following the startup screen.

Figure 16:
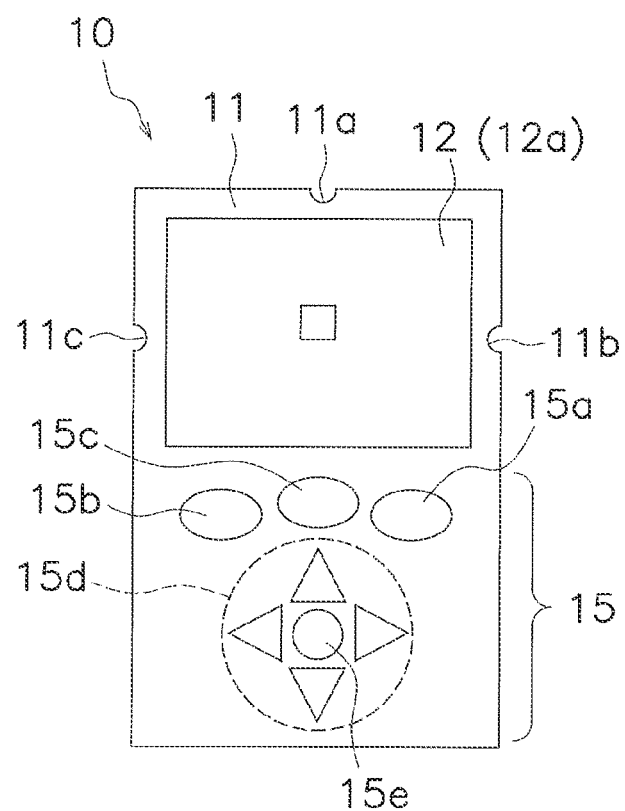
FIG. 16 shows an example of the initial search screen displayed on the display screen of the buried object scanning device in FIG. 3.

The initial search screen is, for example, a screen on which a square is displayed in the center of the display screen 12a, as shown in FIG. 16.

Next, in step S74, in a state in which the rear side of the main body 11 of the activated buried object scanning device 10 is pressed against the construction surface (wall surface 50) to be searched, the user engages a pen or the like in the recess 11a and marks the wall surface 50 with a reference point P1 serving as the scanning start point, thereby setting the initial position at the start of scanning.

(b) Search Scanning

Figure 17:
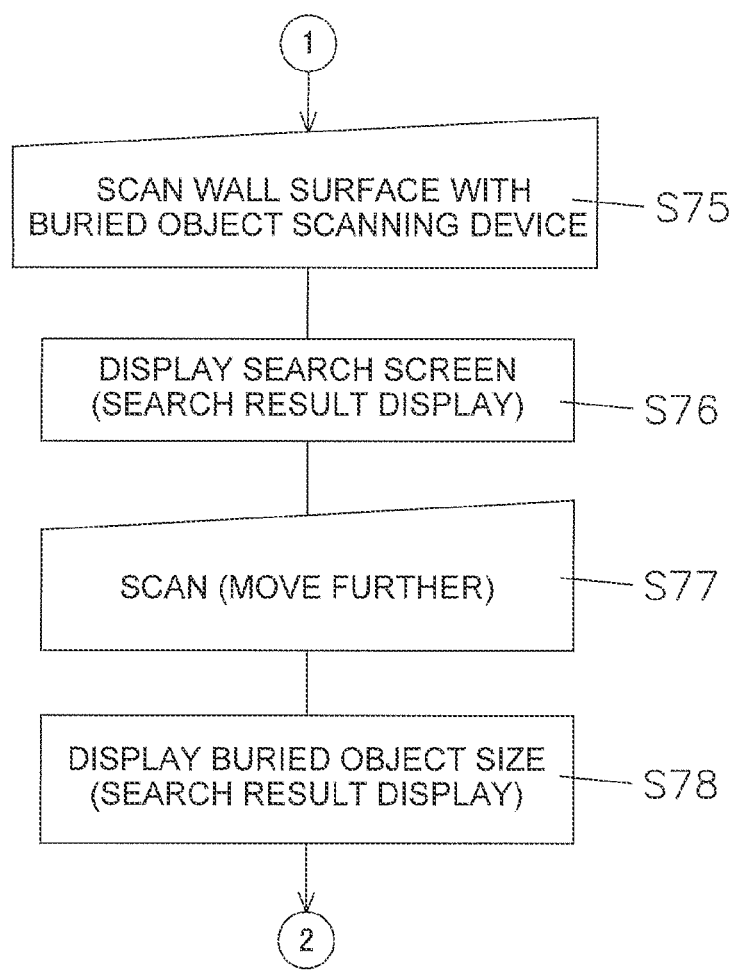
FIG. 17 is a flowchart showing the flow of processing from the start of scanning until the dimensions of the buried object are displayed, and continues from the flowchart in FIG. 16.

Next, as shown in FIG. 17, in step S75, the user moves the buried object scanning device 10 along the wall surface 50 to scan along the construction surface.

Next, in step S76, the display control unit 30 (search image display processing unit 32, origin display processing unit 33) causes the display screen 12a of the buried object scanning device 10 to display a reference point display layer including a search image indicating the search result over the scanned range, and a reference point P1.

Next, in step S77, the user further scans the wall surface 50 with the buried object scanning device 10.

Figure 18:
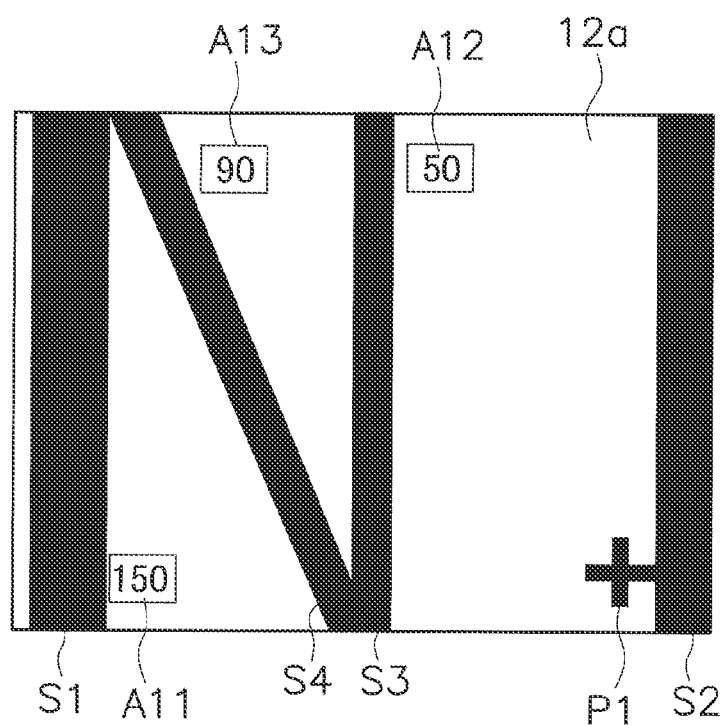
FIG. 18 shows a screen in which the dimensions of a detected buried object are displayed on the search screen of the buried object scanning device, which is displayed by the processing in the flowchart of FIG. 17.

Next, in step S78, when search data is accumulated by further scanning in step S77, the display control unit 30 (search image display processing unit 32) causes detection areas S1, S2, S3, S4 indicating the buried objects 51 included in the scanning area scanned by the buried object scanning device 10, and dimensions A11, A12, and A13 in the scanning direction of the buried objects 51 corresponding to the detection areas S1 to S4 to be displayed on the search image as shown in FIG. 18.

(c) Grid Display and Alignment Operation

Figure 19:
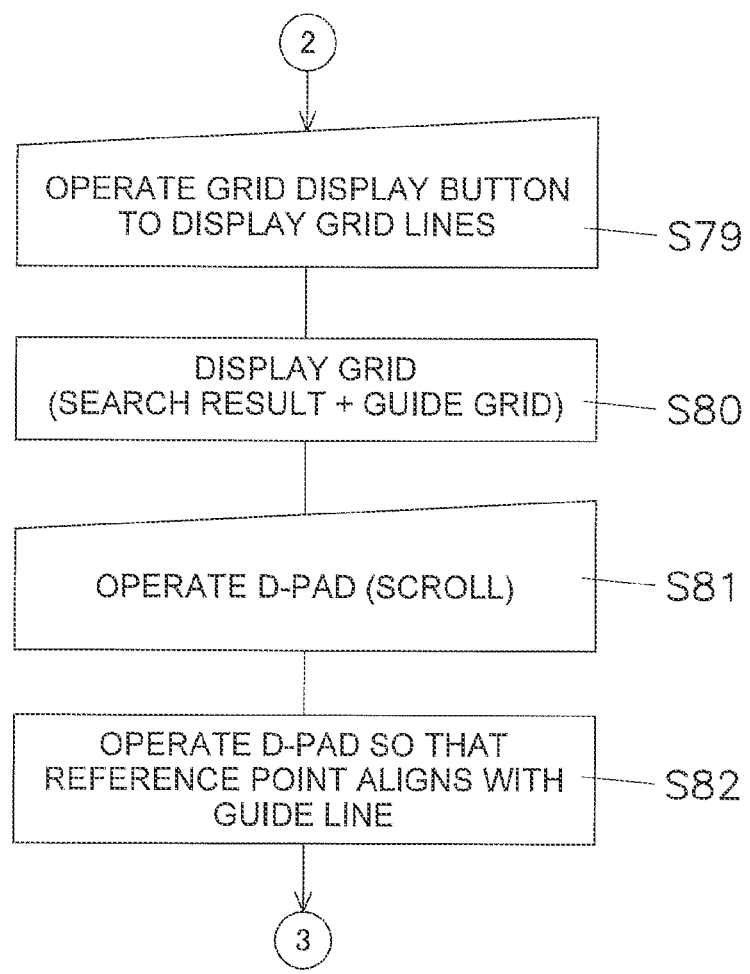
FIG. 19 is a flowchart showing the flow of processing from grid display to position adjustment of the reference point, and continues from the flowchart in FIG. 17.

Next, as shown in FIG. 19, in step S79, after one scan is complete, the user moves the buried object scanning device 10 away from the wall surface 50 and presses the grid display button 15b. If the grid display button 15b has already been pressed, scanning may be performed with the grid layer displayed.

Figure 20A:
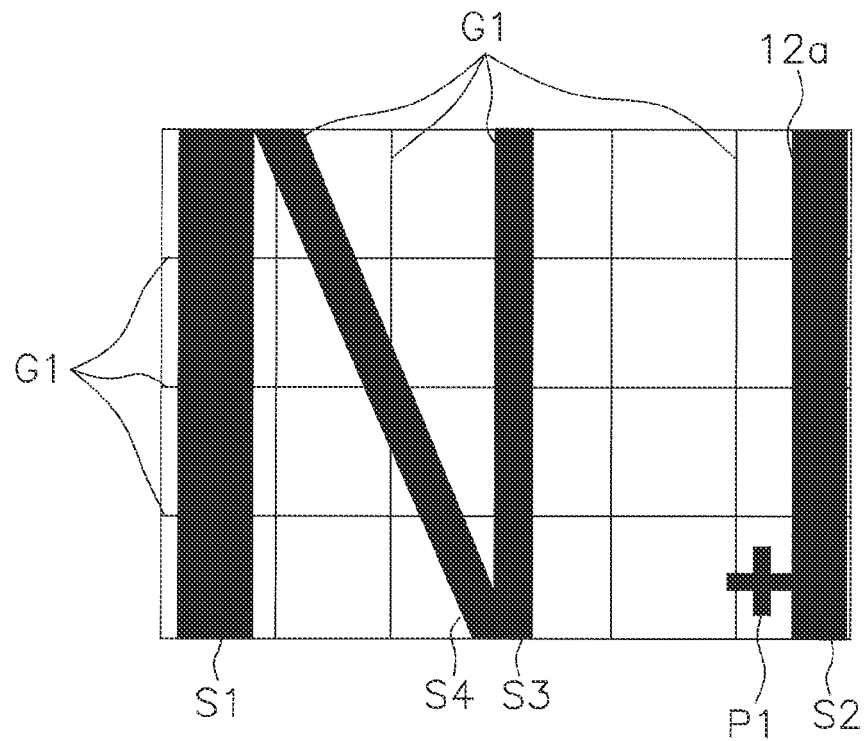
FIG. 20A is a diagram showing a search image and a grid display superimposed on the display screen of the buried object scanning device.

Next, in step S80, as shown in FIG. 20a, the display control unit 30 (grid display processing unit 31) causes the display screen 12a of the display unit 12 to display a grid layer including a plurality of grid lines G1 arranged in a grid pattern, superimposed on the search image.

Next, in step S81, when the user operates the D-pad 15d in the up, down, left, or right direction on the display screen 12a shown in FIG. 20a, the search image and the reference point display layer including the reference point P1 move relative to the grid layer including the grid lines G1 (fixed display).

Figure 20B:
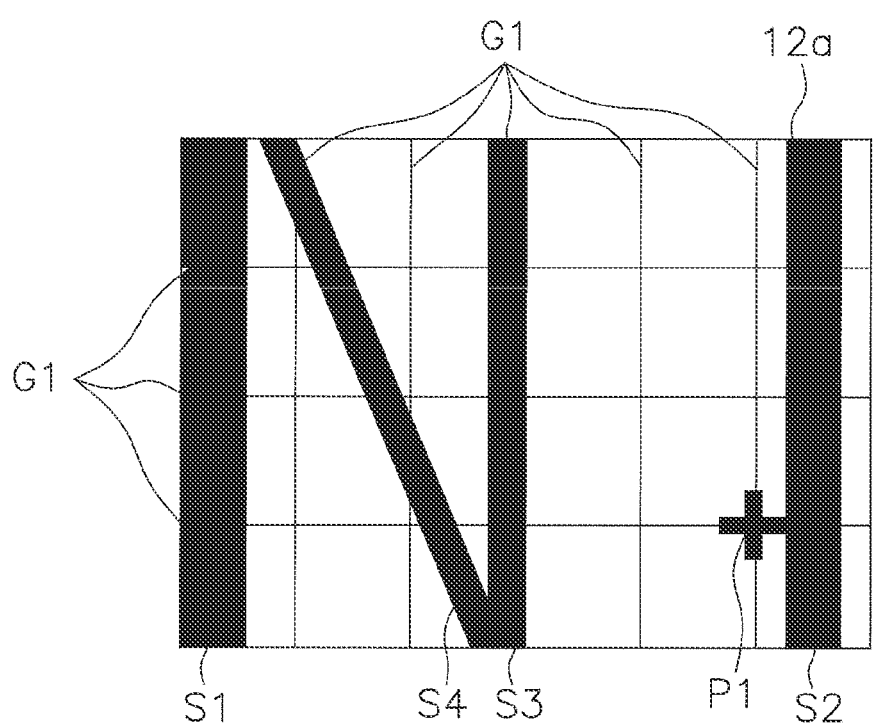
FIG. 20B shows the state after adjusting the position of the reference point included FIG. 20A.

Next, in step S82, when the user operates the D-pad so that the position of the reference point P1 coincides with a specific position of the guide lines, the position of the reference point P1 can be aligned with a specific position of the grid lines included in the grid layer, as shown in FIG. 20B.

Consequently, the position (distance) of the buried object 51 from the reference point P1, the shape of the buried object 51, and so forth can be recognized on the display screen 12a.

(d) Distance and Size of Buried Object by Measurement Grid

Figure 21:
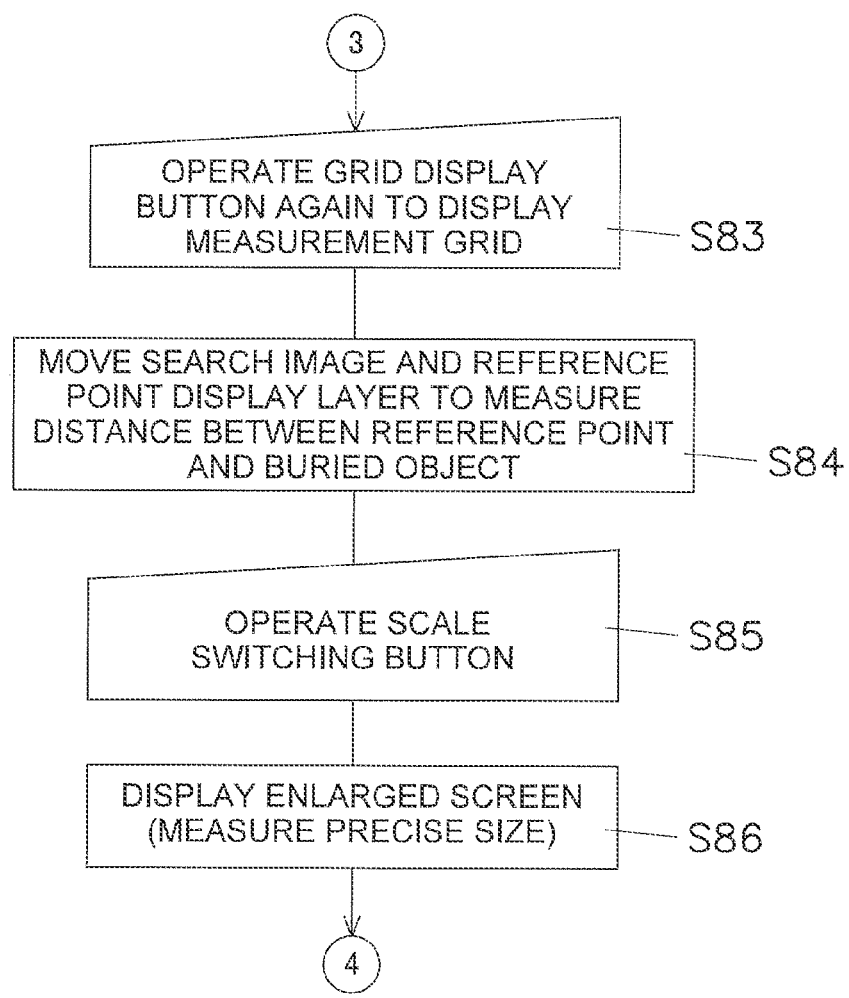
FIG. 21 is a flowchart showing the flow of processing from the measurement grid display to the display of an enlarged screen of the reference point, and continues from FIG. 19.
Figure 22:
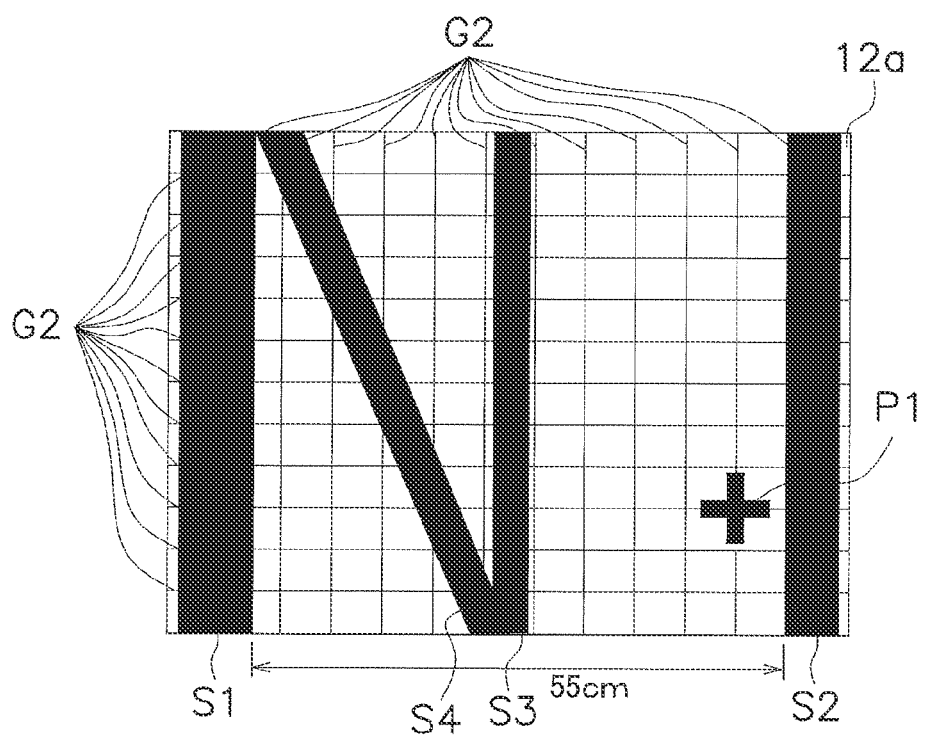
FIG. 22 is a diagram showing a search image and a measurement grid superimposed on the display screen of the buried object scanning device.

Next, as shown in FIG. 21, in step S83, when the user again presses the grid display button 15b, the display control unit 30 (grid display processing unit 31) causes the display screen 12a to display the measurement grid (grid lines) G2 shown in FIG. 22.

As shown in FIG. 22, the displayed measurement grid G2 has a narrower spacing than the grid lines shown in FIG. 20A, etc., so the user can look at the display screen 12a and visually measure the size and distance of the buried object 51 from the reference point P1.

Next, in step S84, when the user operates the D-pad 15d, the display control unit 30 (search image display processing unit 32) moves the search image and the reference point display layer relative to the measurement grid G2 in order to accurately measure the distance between the reference point P1 and the buried object 51 in a state in which a grid layer including the measurement grid G2 is displayed superimposed on the search image.

Consequently, if we let the spacing of the measurement grid G2 shown in FIG. 22 be 5 cm, for example, the user can recognize that the distance between the detection area S1 corresponding to the through-pillar 51a and the detection area S2 corresponding to the stand pillar 51d is about 55 cm while looking at the display screen 12a.

Figure 23A:
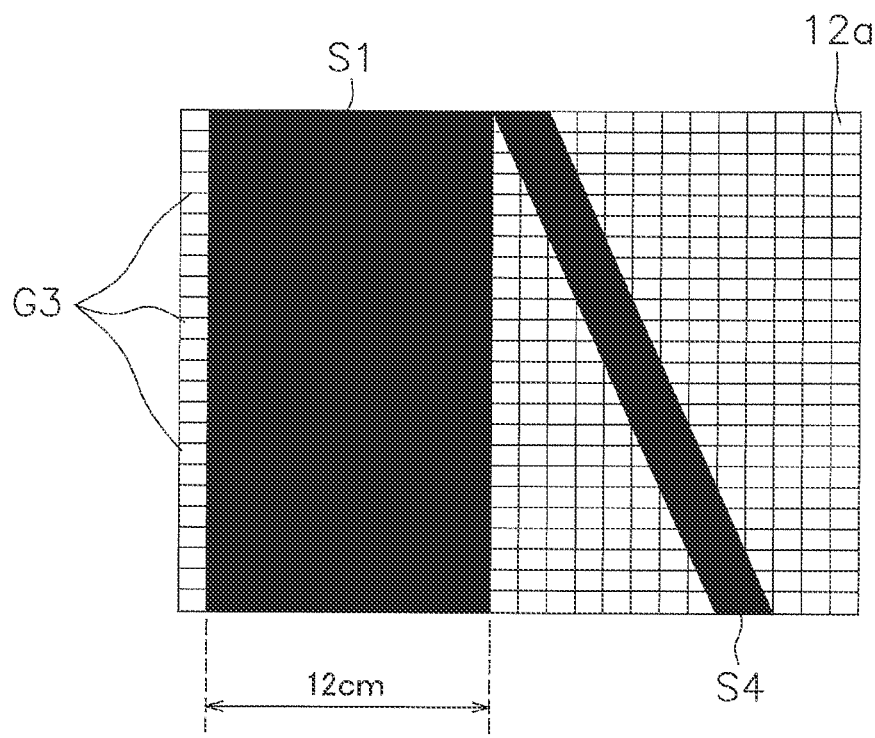
FIGS. 23A and 23B are diagrams showing an enlarged image of a characteristic disposition portion of a buried object in the search image in FIG. 22, and a measurement grid corresponding to the enlarged image.
Figure 23B:
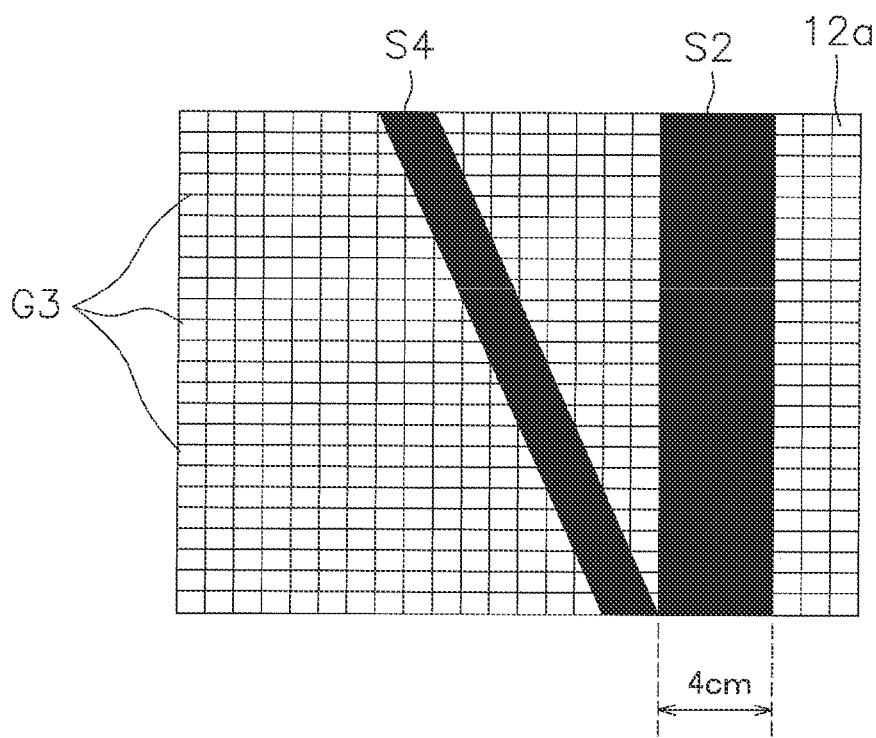

Next, in step S85, when the user presses the scale switching button 15c, in step S86, the display control unit 30 (search image display processing unit 32) displays the area including the characteristic layout of the buried objects 51 included in the search image in FIG. 22, in an enlarged view as shown in FIGS. 23A and 23B.

For example, if we let the spacing of the measurement grid (grid lines) G3 shown in FIGS. 23A and 23B be 1 cm, the user can look at the display screen 12a while measuring the size more precisely, finding the width of the buried object 51 (through-pillar 51a) in the detection area S1 to be about 12 cm, and the width of the buried object 51 (stand pillar 51d) in the detection area S2 to be about 4 cm.

(e) From Construction Work to Switching Off Power

Figure 24:
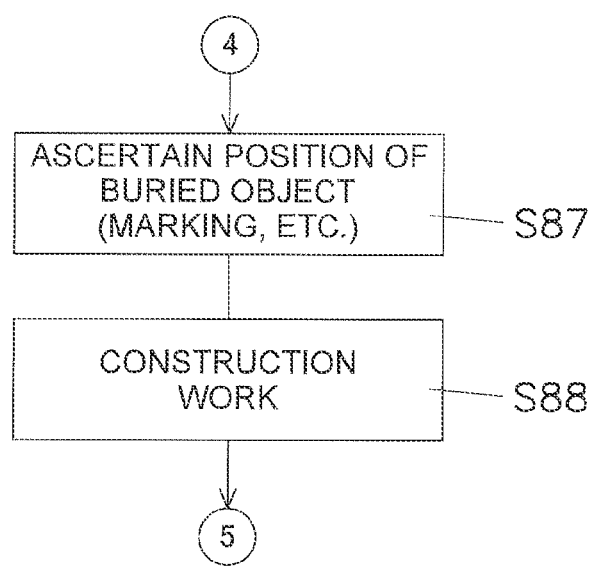
FIG. 24 is a flowchart showing the ascertainment of the position of a buried object and the flow of construction work, and continues from the flowchart of FIG. 21.

Next, as shown in FIG. 24, on the basis of the width of each buried object 51 measured on the display screen 12a by the processing up to step S86, first, in step S87, the user marks the position of each buried object 51 and the width of each, using the position on the wall surface 50 marked as the reference point P1 as a reference, in order to ascertain the actual positions of the buried objects 51.

At this point, marking can also be performed only at the construction position and the positions where buried objects exist.

Next, in step S88, the user performs various construction operations in a state of being aware of the positions of the buried objects 51 marked on the wall surface 50.

Figure 25:
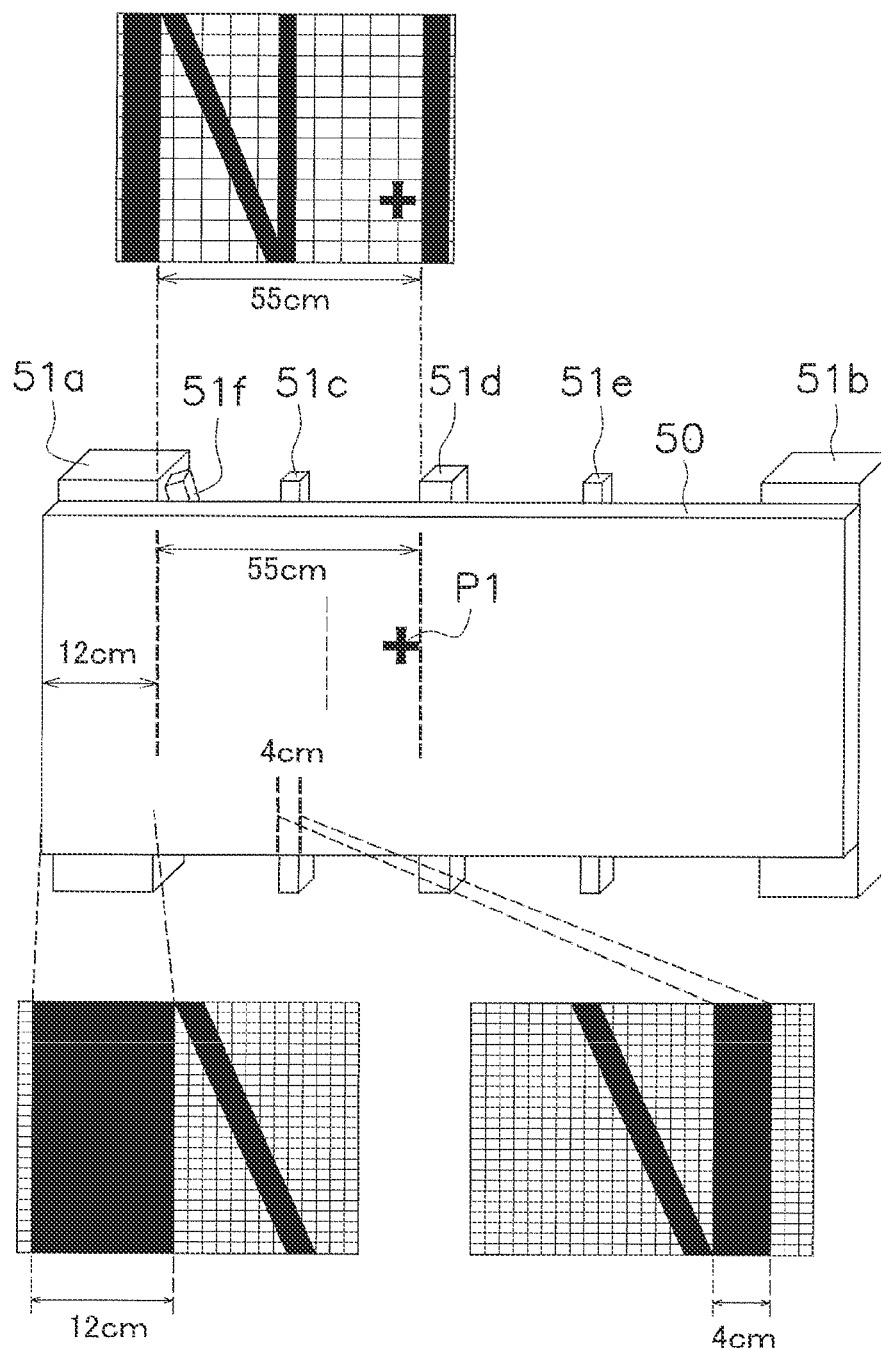
FIG. 25 is a diagram showing construction work for confirming the position of a buried object in an actual wall surface corresponding to the enlarged display in FIGS. 22 and 23A, 23B.

That is, the user performs work on the wall surface 50 (marking if necessary) by using the distance between the reference point P1 and the buried object 51, the size of the buried object 51, and the like displayed on the display screen 12a as shown in FIG. 25, while checking the reference point P1 displayed on the display screen 12a of the buried object scanning device 10, the position of the buried object 51 in the detection areas S1 and S2, and so forth.

After this, the user presses the power button 15a to turn off the power, and the work is finished.

(3) Configuration of Buried Object Information Management Unit 26

Figure 26:
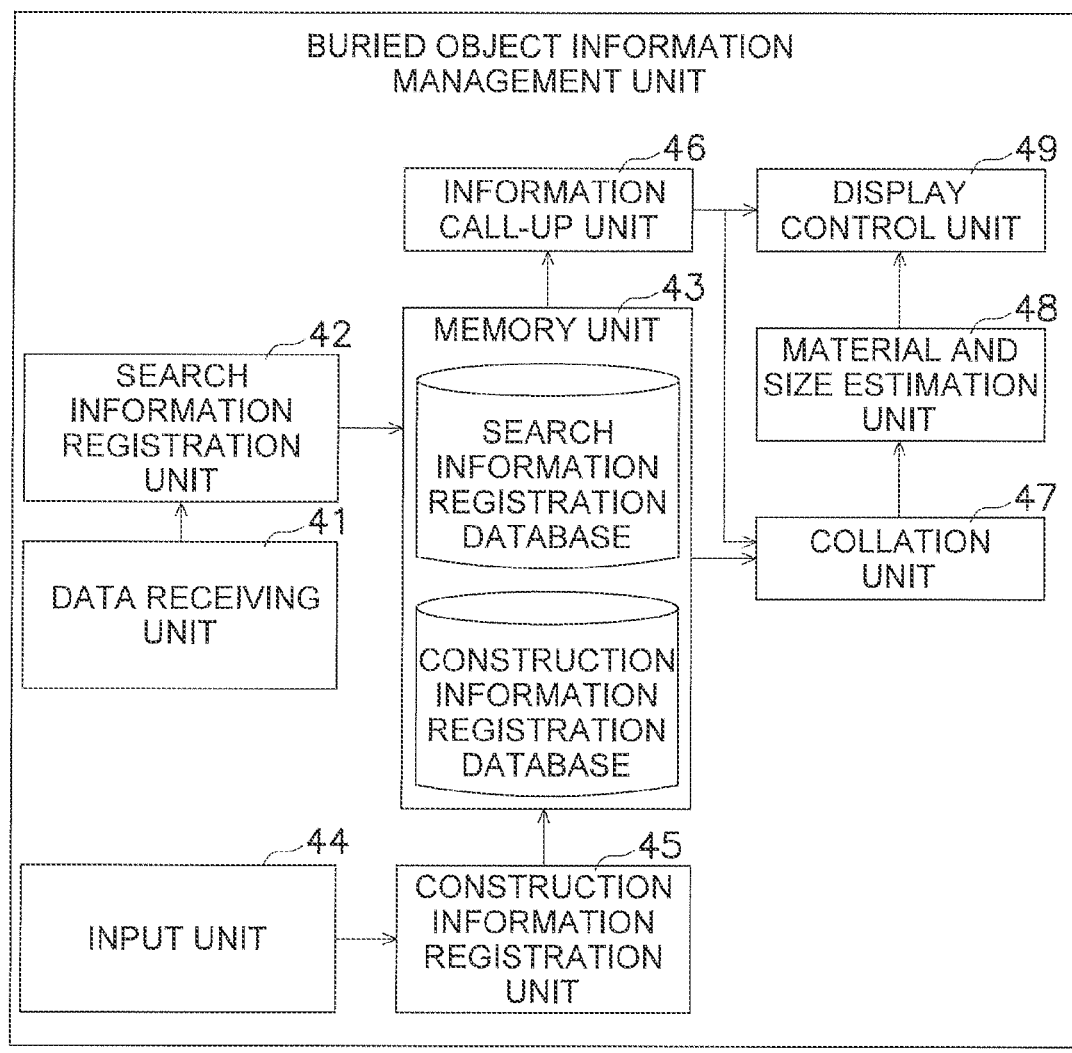
FIG. 26 is a control block diagram showing the internal configuration of the dimensional information management unit included in the dimensional information management device in FIG. 3.

The buried object information management unit 26, as shown in FIG. 26, comprises a data receiving unit (acquisition unit) 41, a search information registration unit 42, a memory unit (information memory unit) 43, an input unit 44, a construction information registration unit 45, an information call-up unit 46, a collation unit 47, a material and size estimation unit 48, and a display control unit (first display control unit) 49.

The data receiving unit (acquisition unit) 41 acquires search information including the dimensions of the buried object 51 calculated by the size calculation processing unit 24 of the buried object scanning device 10, and a search image generated by the search image conversion processing unit 25.

The search information registration unit 42 registers (saves) the search information received from the buried object scanning device 10 by the data receiving unit 41 in the search information registration database of the memory unit 43.

As shown in FIG. 25, the memory unit (information memory unit) 43 stores a search information registration database in which the search information acquired from the buried object scanning device 10 is registered, a construction information registration database in which construction information inputted by a worker or the like is registered, and a buried object table (see FIG. 11) including type and size information about the buried objects 51 in the scanning direction of the buried object scanning device 10.

The memory unit 43 may be provided inside the memory unit 22 of the buried object scanning device 10.

Construction information is inputted to the input unit 44 by a worker or the like.

The construction information registration unit 45 registers (saves) the construction information inputted to the input unit 44 in the construction information registration database of the memory unit 43.

Here, the construction information inputted from the input unit 44 includes, for example, a drawing of buried object structure information (see FIG. 28), the name of the buried object (pillar A) and its width, the strength, number, pitch, and size of the construction materials, the screwing positions, and other such information.

Figure 28:
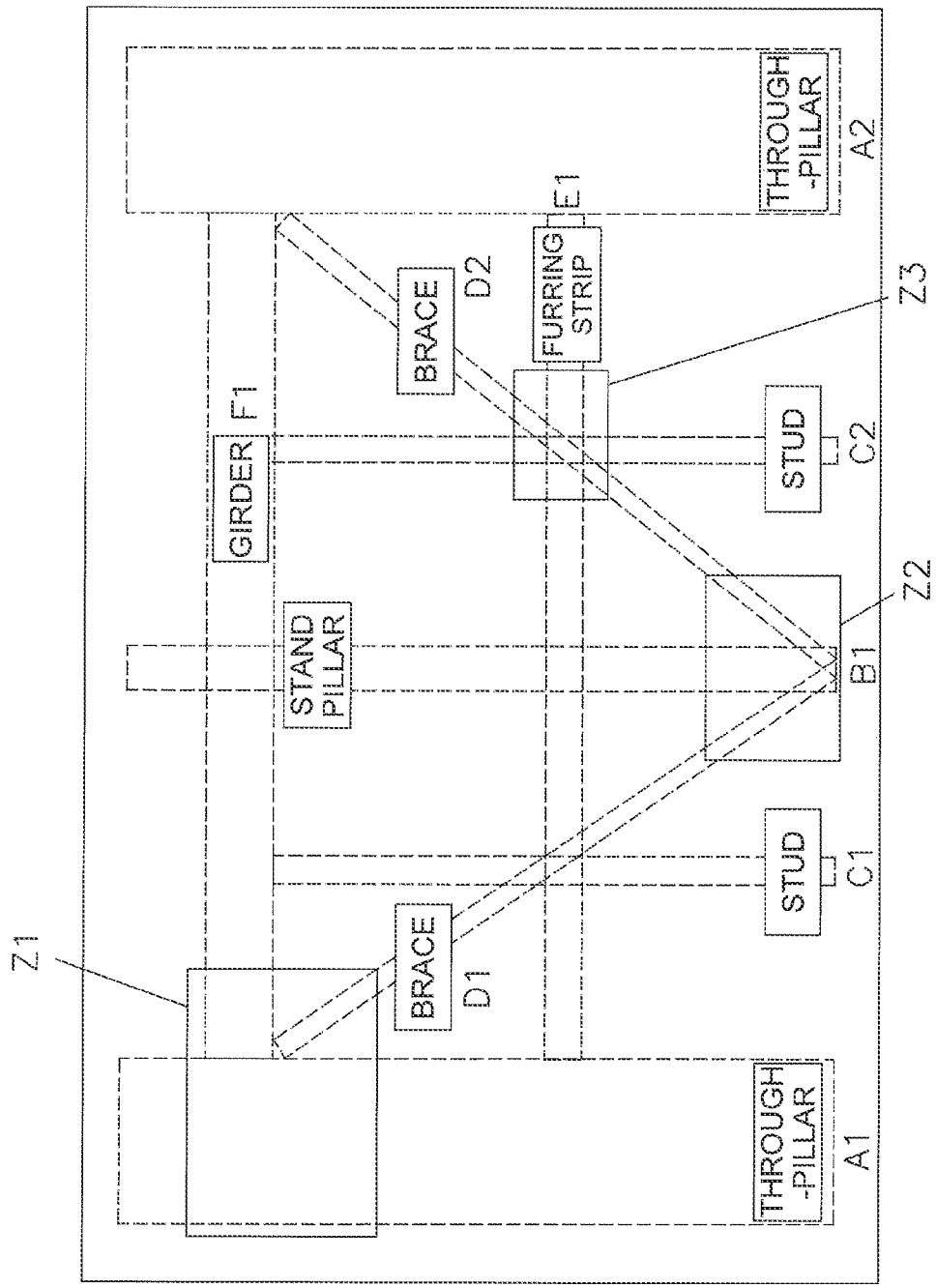
FIG. 28 is a diagram showing an example of buried object structure information stored in the memory unit of the buried object information management unit in FIG. 26.

Here, the drawing of the buried object structure information shown in FIG. 28 is used in collating with the search image generated by scanning the buried object scanning device 10 along the wall surface 50 in the processing to estimate the type and depth of the buried object (discussed below).

The information call-up unit 46 calls up the search information and construction information (buried object structure information, etc.) registered in the search information registration database of the memory unit 43, and transmits these to the display control unit 49 and the collation unit 47.

The collation unit 47 collates the search information received from the search information registration database of the memory unit 43 with the construction information (buried object structure information, etc.) received from the corresponding construction information registration database. The collation unit 47 then compares the search information and the construction information at the positions corresponding to each other, and determines whether or not they match, that is, whether or not the positions of the buried objects 51 in the search image detected by the buried object scanning device 10 match the positions of the buried objects 51 in the drawing.

Figure 27:
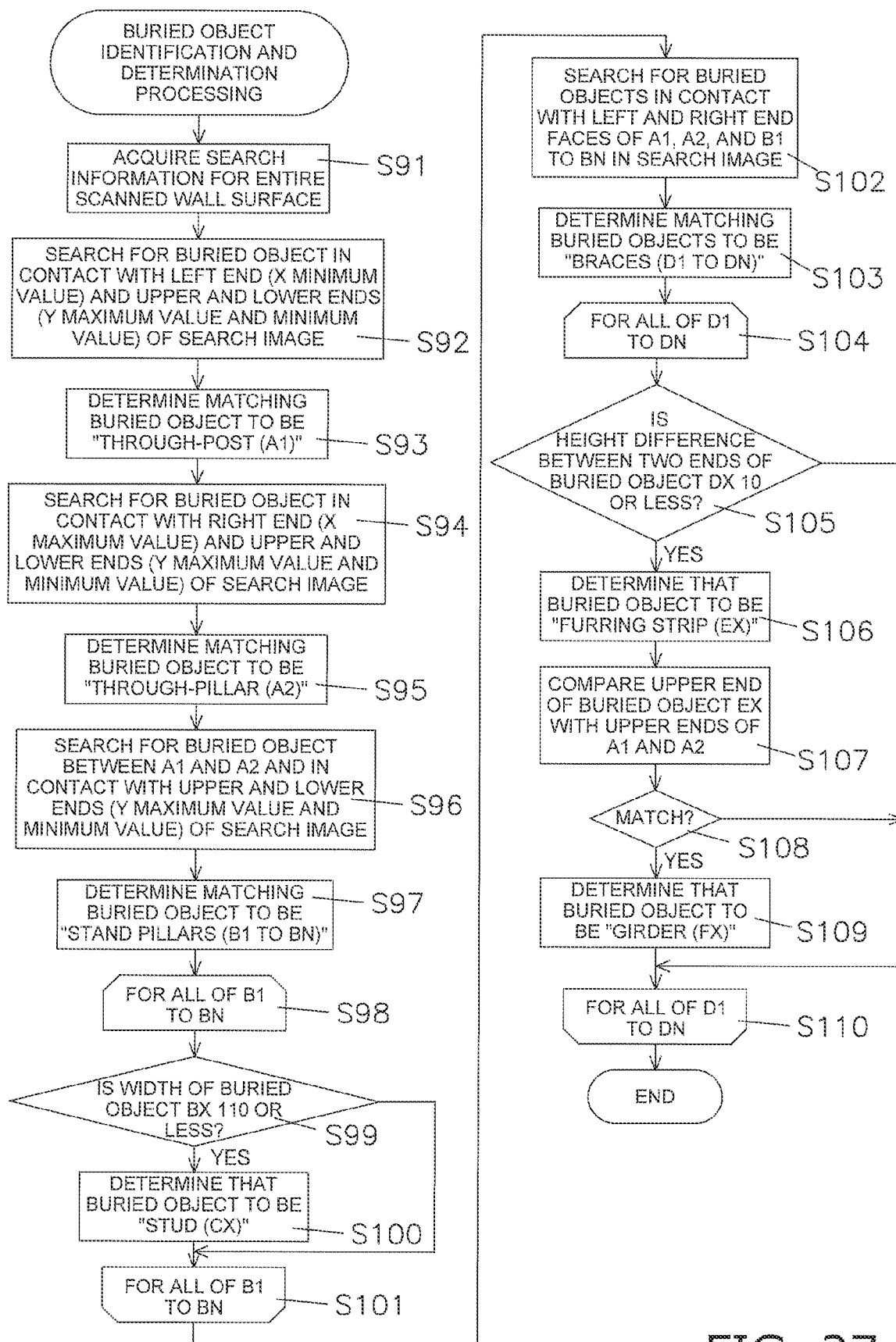
FIG. 27 is a flowchart showing the flow of processing in a buried object information management method (buried object type estimation processing) performed by the buried object information management unit in FIG. 26.

More specifically, according to the flowchart shown in FIG. 27, the collation unit 47 of the buried object information management unit 26 collates the positions of the buried objects in the search image acquired as the search information with the buried object structure information shown in FIG. 28, and estimates the type and depth (thickness) of the matching buried object 51.

Here, as shown in FIG. 28, a case will be described of collating with the search image included in the search information generated by the buried object scanning device 10, using buried object structure information, including a plurality of types of wooden buried objects (through-pillars, studs, stand pillars, braces, joists, furring strips, etc.) as the construction information.

That is, in step S91, the data receiving unit 41 of the buried object information management unit 26 acquires all the search information for the wall surface 50 scanned by the buried object scanning device 10.

The search information for the entire wall surface 50 may be combined with the acquired partial search information to obtain substantially all the search information.

Next, in step S92, the collation unit 47 of the buried object information management unit 26 searches for a buried object that is in contact with the left end (minimum value of the X axis) and the upper and lower ends (maximum value and minimum value of the Y axis) of the search image in the entire search image, that is, the "through-pillar (A1)" included in the drawing of the buried object structure information shown in FIG. 28.

Next, in step S93, the material and size estimation unit 48 of the buried object information management unit 26 determines a buried object that meets the conditions of being in contact with the left end (minimum value of the X axis) and the upper and lower ends (maximum value and minimum value of the Y axis) of the search image to be a "through-pillar (A1)" (see FIG. 28).

Next, in step S94, the collation unit 47 of the buried object information management unit 26 searches the entire search image for a buried object that is in contact with the right end (maximum value of the X axis) and the upper and lower ends (maximum value and the minimum value of the Y axis) of the search image, that is, the "through-pillar (A2)" included in the drawing of the buried object structure information shown in FIG. 28.

Next, in step S95, the material and size estimation unit 48 of the buried object information management unit 26 determines a buried object that meets the conditions of being in contact with the right end (maximum value of the X axis) and the upper and lower ends (maximum value and the minimum value of the Y axis) of the search image to be a "through-pillar (A2)" (see FIG. 28).

Next, in step S96, the collation unit 47 of the buried object information management unit 26 searches the entire search image for a buried object 51 that is in between the through-pillars A1 and A2 included in the search image and is in contact with the upper and lower ends (maximum and minimum values of the Y axis), that is, the "stand pillars (B1 to Bn)" included in the drawing of the buried object structure information shown in FIG. 28.

Next, in step S97, the material and size estimation unit 48 of the buried object information management unit 26 tentatively determines the buried objects 51 that meet the conditions of being in between the "through-pillars (A1, A2)" and in contact with the upper and lower ends (maximum and minimum values of the Y axis) to be the "stand pillars (B1 to Bn)" from the layout thereof.

Next, in step S98, the buried object information management unit 26 repeats the processing of S98 to S101 for each of the buried objects 51 tentatively determined to be the "stand pillars (B1 to Bn)."

Next, in step S99, the material and size estimation unit 48 of the buried object information management unit 26 determines whether or not the width of the buried objects Bx tentatively determined to be the "stand pillars (B1 to Bn)" is 110 mm or less.

Here, if the width is 110 mm or less, the processing proceeds to step S100, and if the width is greater than 110 mm, the determination of the "stand pillars (B1 to Bn)" is maintained as it is, and the processing proceeds to step S101.

Next, in step S100, since the material and size estimation unit 48 of the buried object information management unit 26 determined in step S99 that the width was 110 mm or less, these buried objects are determined to be "studs (Cx)" that are thinner than the "stand pillars (B1 to Bn)."

Next, in step S101, the buried object information management unit 26 repeats the processing of S98 to S101 for each of the buried objects tentatively determined to be the stand pillars (B1 to Bn).

Consequently, in step S97, the buried objects tentatively determined to be the "stand pillars (B1 to Bn)" from their layout can be identified as either the "stand pillars (B1 to Bn)" or the "studs (Cx)."

Next, in step S102, the collation unit 47 of the buried object information management unit 26 searches for a buried object 51 that is in contact with the left and right end faces of the "through-pillars (A1, A2)" and the "stand pillars (B1 to Bn)" included in the search image, that is, the "braces (D1 to Dn)" included in the drawing of the buried object structure information shown in FIG. 28.

Next, in step S103, the material and size estimation unit 48 of the buried object information management unit 26 tentatively determines buried objects that meet the condition of coming into contact with the left and right end faces of the "through-pillars (A1, A2)" and the "stand pillars (B1 to Bn)" included in the search image to be the "braces (D1 to Dn)."

Next, in step S104, the material and size estimation unit 48 of the buried object information management unit 26 repeats the processing of S104 to S110 for each of the buried objects tentatively determined to be the "braces (D1 to Dn)."

Next, in step S105, the material and size estimation unit 48 of the buried object information management unit 26 determines whether or not the difference in height between the two ends of a buried object 51 tentatively determined to be a "brace (Dx)" is 10 mm or less, that is, whether or not a buried object 51 tentatively determined to be a "brace (Dx)" is disposed obliquely.

Here, the material and size estimation unit 48 of the buried object information management unit 26 proceeds to step S106 if the height difference between the two ends is 10 mm or less, and if this difference is greater than 10 mm, leaves the determination of a "brace (Dx)" as it is and proceeds to step S110.

Next, in step S106, since it was determined in step S105 that the height difference between the two ends is 10 mm or less, the material and size estimation unit 48 of the buried object information management unit 26 tentatively determines that this buried object is not a "brace (Dx)," and is instead a "furring strip (Ex)."

Next, in step S107, the material and size estimation unit 48 of the buried object information management unit 26 compares the position of the upper end of the buried object 51 tentatively determined to be a "furring strip (Ex)" with the position of the upper end of the "through-pillars (A1, A2)."

Next, in step S108, it is determined whether or not the position of the upper end of the buried object 51 tentatively determined to be a "furring strip (Ex)" substantially matches the position of the upper end of the "through-pillars (A1, A2)."

That is, it is confirmed here whether the buried object 51 tentatively determined to be the "furring strip (Ex)" is a "girder (Fx)" rather than the "furring strip (Ex)."

Here, if the positions of the two substantially match, the processing proceeds to step S109, and if they do not match, the determination that this buried object is the "furring strip (Ex)" is left as it is, and the processing proceeds to step S110.

Next, in step S109, since the material and size estimation unit 48 of the buried object information management unit 26 determined in step S108 that the positions of the two matched, this buried object is determined to be not the "furring strip (Ex)," but the "girder (Fx)," which is disposed above the "furring strip (Ex)."

Next, in step S110, the buried object information management unit 26 repeats the processing of S104 to S110 for each of the buried objects tentatively determined to be the "furring strip (Ex)".

Also, if it is not possible to acquire a search image that covers substantially the entire wall surface 50 corresponding to the buried object structure information shown in FIG. 28, a partial search image obtained by scanning a part of the wall surface 50 may be collated with the buried object structure information to estimate the type and size of the buried object 51.

Figure 29A:
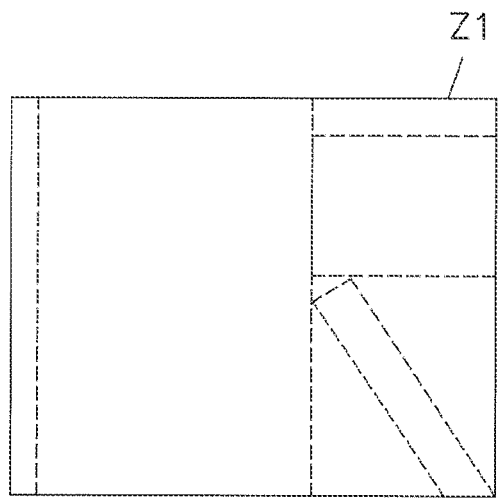
FIGS. 29A to 29C are enlarged views of the characteristic disposition portion of the buried objects Z1 to Z3 in FIG. 28.
Figure 29B:
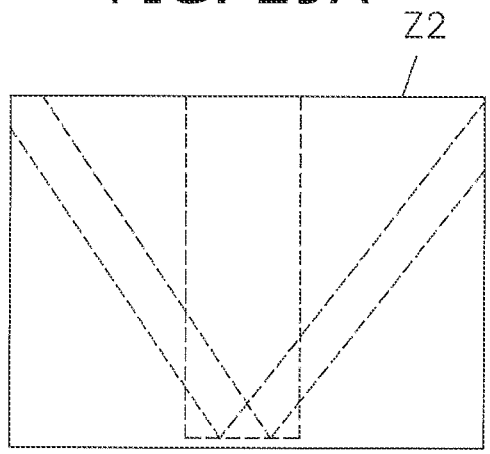
Figure 29C:
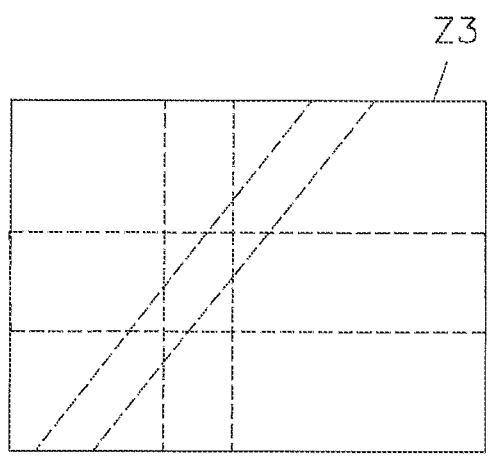

More specifically, the collation unit 47 stores a plurality of partial drawings of the buried object structure information including the characteristic layout of buried objects 51 shown in FIGS. 29A to 29C in advance, and collates with a partial search image obtained by scanning a portion of the wall surface 50.

Here, the drawings of the buried object structure information shown in FIGS. 29A to 29C corresponds to characteristic portions of the layout of the buried objects 51 in the drawings of the buried object structure information in FIG. 28 (characteristic layout portions Z1 to Z3 of the buried objects 51).

For example, a case in which the partial search image shown in FIG. 18, created by scanning with the buried object scanning device 10, is collated with the buried object structure information will be described using FIGS. 30A, 30B, and 31.

Figure 30A:
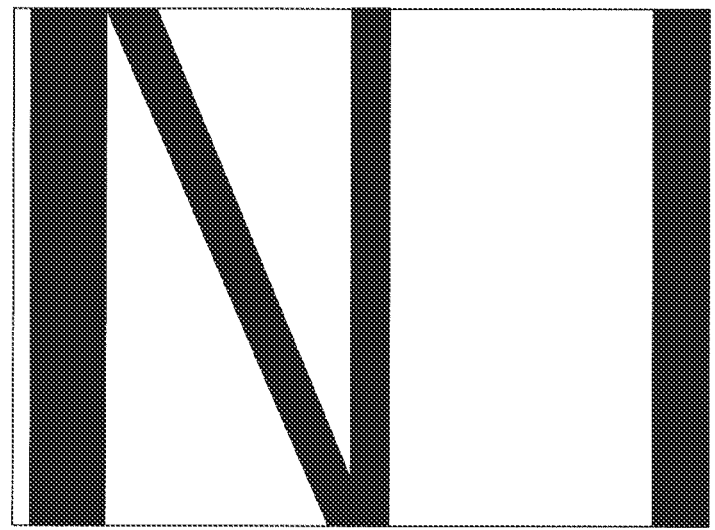
FIGS. 30A and 30B are diagrams showing the simulated collation of the search image with the buried object structure information performed by the buried object information management unit in FIG. 26.
Figure 30B:
Figure 30B:
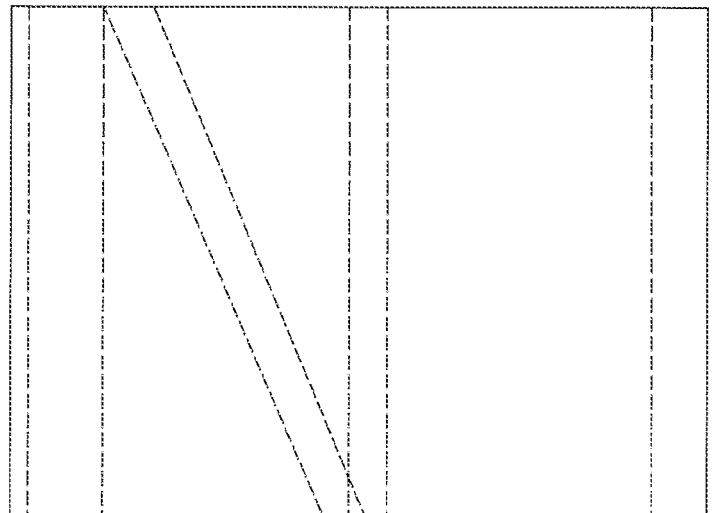

When the buried object scanning device 10 is scanned along a part of the wall surface 50 to obtain the search image shown in FIG. 30A, the collation unit 47 collates the search image with some of the corresponding buried object structure information shown in FIG. 30B.

Figure 31:
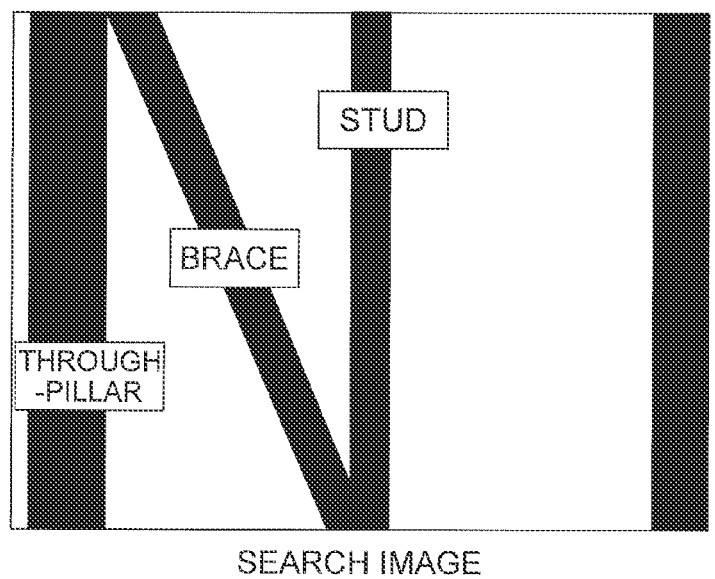
FIG. 31 is a diagram of the display of the type of the buried object, which was determined to match as a result of the collation shown in FIGS. 30A and 30B.

Here, if the collation unit 47 subjects the two to pattern matching and finds that they substantially match, as shown in FIG. 31, the type of the buried object 51 (through-pillar, stud, brace) included in the buried object structure report is estimated, and the display control unit 49 displays the estimated type of the buried object 51 on the search image.

At this point, the depth (thickness) corresponding to the estimated type of buried object 51 may be displayed along with the type of buried object 51 in the search image of FIG. 31 by referring to the buried object table shown in FIG. 11.

Other Embodiments

An embodiment of the present invention was described above, but the present invention is not limited to or by the above embodiment, and various modifications are possible without departing from the gist of the invention.

(A)

In the above embodiment, an example was given in which the present invention was realized as the buried object information management unit 26, as the buried object information management system 1 comprising said device, and as a dimensional information management method, but the present invention is not limited to this.

For instance, the present invention may be realized as a buried object information management program for causing a computer to execute the buried object information management method of the buried object information management unit 26 described above.

This buried object information management program is stored in a memory (memory unit) installed in the buried object information management device, and the CPU reads the buried object information management program stored in the memory and causes the hardware to execute the various steps.

More specifically, the same effect as described above can be obtained by having the CPU read the buried object information management program and execute an acquisition step of acquiring search information including search images produced by a buried object scanning device, an input step of receiving the input of construction information including position information about the buried object in the target, and a collation step of collating the search information acquired in the acquisition step with the construction information inputted in the input step, and determining whether or not there is a match.

Also, the present invention may be realized as a recording medium on which is stored the buried object information management program used by the buried object information management device.

(B)

In the above embodiment, an example was given in which the buried object information management unit 26 serving as the buried object information management device of the present invention was provided inside the buried object scanning device 10, but the present invention is not limited to this.

For instance, the present invention may be realized as an external device comprising the configuration of a buried object information management device, such as a personal computer (PC) used by a manager, or a mobile terminal such as a smartphone or a tablet terminal owned by a worker at a construction site.

That is, an external device that acquires the search image and the construction information transmitted from a buried object scanning device may be configured as the buried object information management device of the present invention to implement the above-mentioned buried object information management method.

(C)

In the above embodiment, an example was given in which the present invention was applied to a capacitance-type buried object scanning device 10 in which the capacitance sensor 13 was used as a sensing unit, but the present invention is not limited to this.

For instance, the present invention may be applied to an electromagnetic wave-type buried object scanning device that receives a reflected electromagnetic wave emitted toward concrete or a wall material, and senses the position of the buried object.

(D)

In the above embodiment, an example was given in which the optical sensor 14 was used as the scanning unit for sensing the amount of movement of the buried object scanning device 10 on the wall surface, but the present invention is not limited to this.

For instance, the amount of movement of the buried object scanning device on the wall surface may be sensed by using a scanning unit that employs something other than an optical method.

(E)

In the above embodiment, an example was given in which the grid layer including the grid lines was in a fixed display, and the search image was moved, so that the search image was displayed in a state of being movable relative to the grid layer. However, the present invention is not limited to this.

For instance, the search image may be in a fixed display, and the grid layer may be displayed in a movable state.

Alternatively, both the search image and the grid layer may be displayed in a movable state as needed.

(F)

In the above embodiment, an example was given in which the buried object scanning device 10 was used to detect a wooden material (pillar, ground sill, beam, brace, etc.) contained in a wall surface such as drywall or plywood as the type of buried object estimated by the buried object information management unit 26, but the present invention is not limited to this.

For instance, the type of buried object that is estimated by the buried object information management device may be some material other than a wooden material, such as a metal material or a resin material.

Similarly, the target may also be some material other than drywall, plywood, or other such wall surface, such as concrete.

That is, the buried object scanning device of the present invention may be used, for example, for detecting other materials, or foreign substances located in the ground.

(G)

In the above embodiment, an example was given in which the D-pad 15*d* was used to move the search image or the reference point display layer relative to the fixedly displayed grid layer on the display screen 12*a* of the display unit 12 of the buried object scanning device 10, but the present invention is not limited to this.

For instance, the buried object scanning device may be actually moved over the wall surface, so that the search image is moved on the basis of the information about the movement amount sensed by an encoder, a tracking sensor, or the like.

Alternatively, a cursor may be operated on a table to move the search image 1 mm the first time, 2 mm the second time, and so forth, according to the time change at the button, for example.

(H)

In the above embodiment, an example was given in which three types of grid layer, namely, the standard grid line G1, the measurement grid G3, and the measurement grid G3 for enlarged display, were used, but the present invention is not limited to this.

For instance, it is preferable to use a grid layer in which appropriately spaced grid lines are arranged according to the size (the size in the scanning direction) of the buried object to be detected.

(I)

In the above embodiment, an example was given in which the search image and the construction information were compared using the reference point P1 indicating the scanning start point of the buried object scanning device 10 as a reference, but the present invention is not limited to this.

For instance, when scanning with the buried object scanning device is commenced with reference to the edge of the wall surface, the position, etc., of the buried object or the like may be collated with reference to the edge of the wall surface, without providing any reference point.

INDUSTRIAL APPLICABILITY

The buried object information management device of the present invention has the effect of making it possible to identify the type of buried object installed in a target, and therefore can be broadly applied as various kinds of device for managing information about a buried object detected using a buried object scanning device.

The invention claimed is:

1. A buried object information management device that manages information about a buried object included in an search image showing a presence or an absence of a buried object in a target generated by a buried object scanning device scanned along the target, the buried object information management device comprising a processor configured with a program to perform operations comprising:
    operation as an acquisition unit configured to acquire search information including the search image generated by the buried object scanning device;
    operation as an input unit to which construction information including position information about the buried object in the target is inputted; and
    operation as a collation unit configured to collate the search information acquired by operation as the acquisition unit with the construction information inputted by operation as the input unit, and determine whether or not there is a match, and
    operation as a material estimation unit configured to estimate a type of the buried object when a result of a collation by operation as the collation unit is that the search information matches the construction information.

2. The buried object information management device according to claim 1,
    wherein operation as the collation unit comprises collating the search information with the construction information by using a scanning starting point included in the search image as a reference point.

3. The buried object information management device according to claim 1,
    wherein operation as the collation unit comprises collating the search information with the construction information by subjecting the search image including the buried object to pattern matching with drawings included in the construction information.

4. The buried object information management device according to claim 3,
    wherein operation as the collation unit comprises collating the search information with the construction information by subjecting the search image to pattern matching with an entire drawing included in the construction information.

5. The buried object information management device according to claim 3,
    wherein operation as the collation unit comprises collating the search information with the construction information by subjecting the search image to pattern matching with a characteristic portion of a portion of a drawing included in the construction information.

6. The buried object information management device according to claim 1,
    wherein operation as the material estimation unit comprises estimating the type of the buried object on the basis of position information and/or dimensional information about the buried object included in the search information.

7. The buried object information management device according to claim 1, wherein the processor is configured with the program to perform operations
    further comprising operation as a buried object information memory unit configured to store a buried object table including information about a plurality of types of buried object estimated by operation as the material estimation unit.

8. The buried object information management device according to claim 7, wherein the processor is configured with the program to perform operations
    further comprising operation as a dimension estimation unit configured to estimate a depth dimension of the buried object by referring to the buried object table stored by operation as the buried object information memory unit, on the basis of the type of the buried object estimated by operation as the material estimation unit.

9. The buried object information management device according to claim 1, wherein the processor is configured with the program to perform operations
    further comprising operation as a search information memory unit configured to store the search information acquired by operation as the acquisition unit and the construction information inputted to the input unit.

10. The buried object information management device according to claim 9, wherein the processor is configured with the program to perform operations further comprising
    operation as an information call-up unit configured to call up arbitrary information from the search information and the construction information stored by operation as the search information memory unit; and
    operation as a first display control unit configured to cause a first display to display the information called up by operation as the information call-up unit.

11. The buried object information management device according to claim 10,
    wherein operation as the first display control unit comprises controlling the first display so as to display position information about the buried object, whose origin is the starting point of a scan included in the search image, as the search information.

12. The buried object information management device according to claim 1,
    wherein the construction information includes information about at least one of the following: a name and dimensions of the buried object that is the target, and the position, type, pitch, and number of screws to be used.

13. A buried object information management system, comprising:
    a buried object information management device that manages information about a buried object included in an search image showing a presence or an absence of a buried object in a target generated by a buried object scanning device scanned along the target, the buried object information management device comprising a first processor configured with a first program to perform operations comprising: operation as an acquisition unit configured to acquire search information including the search image generated by the buried object scanning device; operation as an input unit to which construction information including position information about the buried object in the target is inputted; and operation as a collation unit configured to collate the search information acquired by operation as the acquisition unit with the construction information inputted by operation as the input unit, and determine whether or not there is a match,
wherein the buried object scanning device comprises a second display and second processor configured with a second program to perform operations comprising:
operation as a data transfer unit configured to transfer the search image to the acquisition unit of the buried object information management device;
operation as a detection unit configured to detect the presence or absence of the buried object;
operation as a search image conversion processing unit configured to convert a detection result from the detection unit into the search image; and
operation as a memory unit configured to store the search image and a grid layer including grid lines corresponding to a predetermined scale; wherein
the second display is configured to display the search image and the grid layer.

14. The buried object information management system according to claim 13,
wherein the second processor of the buried object scanning device is configured with the second program to perform operations further comprising:
operation as an operation input unit to which various operations are inputted; and
operation as a second display control unit configured to control the second display so that the search image and the grid layer are displayed superimposed, and the search image is displayed in a state of being able to move relative to the grid layer in response to input by operation as the operation input unit.

15. A buried object information management method for managing information about a buried object included in a search image showing a presence or an absence of the buried object in a target generated by a buried object scanning device that is scanned along the target, the method comprising:
acquiring search information including the search image generated by the buried object scanning device;
inputting construction information including position information about the buried object in the target; and
a collation step of collating the search information acquired with the construction information inputted, and determining whether or not there is a match; and
a material estimation step of estimating a type of the buried object when a result of a collation by operation as the collation unit is that the search information matches the construction information.

16. A non-transitory computer-readable medium storing a buried object information management program that manages information about a buried object included in a search image showing a presence or an absence of the buried object in a target generated by a buried object scanning device that is scanned along the target, the buried object information management program when read and executed causing a computer to execute a buried object information management method comprising:
acquiring search information including the search image generated by the buried object scanning device;
inputting construction information including position information about the buried object in the target; and
a collation step of collating the search information acquired with the construction information inputted, and determining whether or not there is a match; and
a material estimation step of estimating a type of the buried object when a result of a collation by operation as the collation unit is that the search information matches the construction information.

* * * * *